(12) United States Patent
Misra et al.

(10) Patent No.: US 11,290,716 B2
(45) Date of Patent: Mar. 29, 2022

(54) SYSTEMS AND METHODS FOR PARTITIONING VIDEO BLOCKS IN AN INTER PREDICTION SLICE OF VIDEO DATA

(71) Applicants: Sharp Kabushiki Kaisha, Sakai (JP); FG Innovation Company Limited, New Territories (HK)

(72) Inventors: Kiran Mukesh Misra, Vancouver, WA (US); Jie Zhao, Vancouver, WA (US); Christopher Andrew Segall, Vancouver, WA (US); Michael Horowitz, Vancouver, WA (US); Weijia Zhu, Vancouver, WA (US); Frank Bossen, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 69 days.

(21) Appl. No.: 16/635,192

(22) PCT Filed: Jul. 27, 2018

(86) PCT No.: PCT/JP2018/028316
§ 371 (c)(1),
(2) Date: Jan. 30, 2020

(87) PCT Pub. No.: WO2019/026807
PCT Pub. Date: Feb. 7, 2019

(65) Prior Publication Data
US 2021/0092372 A1    Mar. 25, 2021

Related U.S. Application Data

(60) Provisional application No. 62/636,667, filed on Feb. 28, 2018, provisional application No. 62/598,956, (Continued)

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11);
(Continued)

(58) Field of Classification Search
CPC .... H04N 19/176; H04N 19/11; H04N 19/159; H04N 19/593; H04N 19/119;
(Continued)

(56) References Cited

U.S. PATENT DOCUMENTS

| | | | |
|---|---|---|---|
| 10,542,275 B2 * | 1/2020 | Panusopone | H04N 19/593 |
| 10,616,596 B2 * | 4/2020 | Panusopone | H04N 19/176 |

(Continued)

FOREIGN PATENT DOCUMENTS

| | | | | |
|---|---|---|---|---|
| EP | 3503550 A4 * | 6/2019 | | H04N 19/176 |
| EP | 3509298 A4 * | 7/2020 | | H04N 19/11 |

(Continued)

OTHER PUBLICATIONS

Misra et al., "Description of SDR and HDR video coding technology proposal by Sharp and Foxconn", Joint Video Exploration Team (JVET) of ITU-T SG 16 WP 3 and ISO/IEC JTC 1/SC 29/WG 11, JVET-J0026, Apr. 10-20, 2018, 69 pages.
(Continued)

*Primary Examiner* — Reza Aghevli
(74) *Attorney, Agent, or Firm* — ScienBiziP, P.C.

(57) ABSTRACT

A video coding device may be configured to perform video coding comprising: receiving a video block including sample values for a first component of video data and a second component of video data; partitioning the sample values for the first component of video data and the second
(Continued)

component of video data according to a first quad tree binary tree (QTBT) partitioning structure; and for samples values of the first component of video data included in nodes of the first quad tree binary tree associated with an intra prediction type, further partitioning the samples according to a second quad tree binary tree.

10 Claims, 18 Drawing Sheets

Related U.S. Application Data filed on Dec. 14, 2017, provisional application No. 62/564,020, filed on Sep. 27, 2017, provisional application No. 62/553,020, filed on Aug. 31, 2017, provisional application No. 62/542,268, filed on Aug. 7, 2017, provisional application No. 62/541,032, filed on Aug. 3, 2017.

(51) Int. Cl.
  *H04N 19/176*  (2014.01)
  *H04N 19/186*  (2014.01)
  *H04N 19/46*  (2014.01)
  *H04N 19/169*  (2014.01)

(52) U.S. Cl.
  CPC ....... *H04N 19/186* (2014.11); *H04N 19/1883* (2014.11); *H04N 19/46* (2014.11)

(58) Field of Classification Search
  CPC ...... H04N 19/96; H04N 19/70; H04N 19/186; H04N 19/61; H04N 19/174; H04N 19/103

See application file for complete search history.

(56) References Cited

U.S. PATENT DOCUMENTS

| | | | | |
|---|---|---|---|---|
| 10,863,207 | B2 * | 12/2020 | Hsiang | H04N 19/105 |
| 10,944,963 | B2 * | 3/2021 | Yu | H04N 19/42 |
| 11,109,045 | B2 * | 8/2021 | Urban | H04N 19/186 |
| 2015/0189298 | A1 * | 7/2015 | Ye | H04N 19/16 375/240.02 |
| 2016/0366449 | A1 * | 12/2016 | Stessen | H04N 19/85 |
| 2017/0054989 | A1 * | 2/2017 | Stessen | H04N 19/44 |
| 2017/0272750 | A1 * | 9/2017 | An | H04N 19/174 |
| 2017/0347093 | A1 * | 11/2017 | Yu | H04N 19/42 |
| 2018/0048889 | A1 * | 2/2018 | Zhang | H04N 19/159 |
| 2018/0063553 | A1 * | 3/2018 | Zhang | H04N 19/463 |
| 2018/0184103 | A1 * | 6/2018 | Panusopone | H04N 19/11 |
| 2018/0184110 | A1 * | 6/2018 | Panusopone | H04N 19/593 |
| 2018/0332288 | A1 * | 11/2018 | Hsiang | H04N 19/159 |
| 2019/0313105 | A1 * | 10/2019 | Panusopone | H04N 19/54 |

FOREIGN PATENT DOCUMENTS

| | | | | |
|---|---|---|---|---|
| RU | 2517253 | C1 | 5/2014 | |
| RU | 2601843 | C2 | 11/2016 | |
| WO | 2011071308 | A2 | 6/2011 | |
| WO | 2012170812 | A1 | 12/2012 | |
| WO | 2016/091161 | A1 | 6/2016 | |
| WO | 2016090568 | A1 | 6/2016 | |
| WO | 2017/088810 | A1 | 6/2017 | |
| WO | WO-2019203940 | A1 * | 10/2019 | H04N 19/132 |

OTHER PUBLICATIONS

Official Communication issued in International Patent Application No. PCT/JP2018/028316, dated Oct. 16, 2018.

Misra, K. et al.; "CE1: Shared-separate partition tree in QT+BT configuration (Tests 5.3.1 and 5.4.1)"; Joint Video Experts Team (JVET) of ITU-T SG 16 WP 3 and ISO/IEC JTC 1/SC 29/WG11; Document: JVET-K0353-v1; Jul. 10-18, 2018; pp. 1-4.

Misra, K. et al.; "Description of SDR and HDR video coding technology proposal by Sharp and Foxconn"; Joint Video Exploration Team (JVET) of ITU-T SG 16 WP 3 and ISO/IEC JTC 1/SC 29/WG11; Document: JVET-J0026; Apr. 10-20, 2018; 10 pages.

Zhang, K. et al.: "Enhanced Cross-component Linear Model Intra-prediction"; Joint Video Exploration Team (JVET) of ITU-T SG 16 WP 3 and ISO/IEC JTC 1/SC 29/WG11; Document: JVET-D0110; Oct. 15-21, 2016; p. 1-6.

Liu, H. et al.; "Local Illumination Compensation"; ITU—Telecommunications Standardization Sector; Study Group 16; Question 6; Video Coding Experts Group (VCEG); Document VCEG-AZ06; Jun. 19-26, 2015; 4 pages.

Li, X. et al.; "Multi-Type-Tree"; Joint Video Exploration Team (JVET) of ITU-T SG 16 WP 3 and ISO/IEC JTC 1/SC 29/WG11; Document: JVET-D0117r1; Oct. 15-21, 2016; p. 1-3.

Chen, J. et al.; "Algorithm Description of Joint Exploration Test Model 7 (JEM 7)"; Joint Video Exploration Team (JVET) of ITU-T SG 16 WP 3 and ISO/IEC JTC 1/SC 29/WG11; Document: JVET-G1001-v1; Jul. 13-21, 2017; 50 pages.

Chen, J. et al.; "Algorithm Description of Joint Exploration Test Model 6 (JEM 6)"; Joint Video Exploration Team (JVET) of ITU-T SG 16 WP 3 and ISO/IEC JTC 1/SC 29/WG11; Document: JVET-F1001-v3; Mar. 31-Apr. 7, 2017; 51 pages.

"High efficiency video coding"; Telecommunication Standardization Sector of International Telecommunication Union (ITU-T); Series H: Audiovisual and Multimedia Systems; Inftastructure of audiovisual services—Coding of moving video; H.265; Apr. 2015; 634 pages.

"Advanced vido coding for generic audiovisual services"; Telecommunication Standardization Sector of International Telecommunication Union (ITU); Series H: Audiovisual and Multimedia Systems; Infrastructure of audiovisual services—Coding of moving video; H.264; Jun. 2019; 836 pages.

F. Le Léannec et. al. "Asymmetric Coding Units in QTBT", JVET-D0064, Joint Video Exploration Team (JVET), of ITU-T SG 16 WP 3 and ISO/IEC JTC 1/SC 29/WG 11, 4th Meeting: Chengdu, CN, Oct. 15-21, 2016.

* cited by examiner

SYSTEMS AND METHODS FOR PARTITIONING VIDEO BLOCKS IN AN INTER PREDICTION SLICE OF VIDEO DATA

CROSS REFERENCE

This Nonprovisional application claims priority under 35 U.S.C. § 119 on provisional Application No. 62/541,032 on Aug. 3, 2017 and provisional Application No. 62/542,268 on Aug. 7, 2017 and provisional Application No. 62/553,020 on Aug. 31, 2017 and provisional Application No. 62/564,020 on Sep. 27, 2017 and provisional Application No. 62/598,956 on Dec. 14, 2017 and provisional Application No. 62/636,667 on Feb. 28, 2018, the entire contents of which are hereby incorporated by reference.

TECHNICAL FIELD

This disclosure relates to video coding and more particularly to techniques for partitioning a picture of video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265 April 2015, which is incorporated by reference, and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 6 (JEM 6), Algorithm Description of Joint Exploration Test Model 6 (JEM 6), ISO/IEC JTC1/SC29/WG11 Document: JVET-F1001v3, April 2017, Hobart, AU, and the Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, each which are incorporated by reference herein, describe the coding features that are under coordinated test model study by the JVET as potentially enhancing video coding technology beyond the capabilities of ITU-T H.265. It should be noted that the coding features of JEM 6 and JEM 7 are implemented in JEM reference software. As used herein, the term JEM is used to collectively refer to algorithms included in JEM 6 and JEM 7 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In general, this disclosure describes various techniques for coding video data. In particular, this disclosure describes techniques for partitioning a picture of video data. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

An aspect of the invention is a method of partitioning video data for video coding, the method comprising: receiving a video block including sample values for a first component of video data and a second component of video data; partitioning the sample values for the first component of video data and the second component of video data according to a first quad tree binary tree partitioning structure; and for samples values of the first component of video data included in nodes of the first quad tree binary tree associated with an intra prediction type, further partitioning the samples according to a second quad tree binary tree.

DESCRIPTION OF EMBODIMENTS

Figure 1:
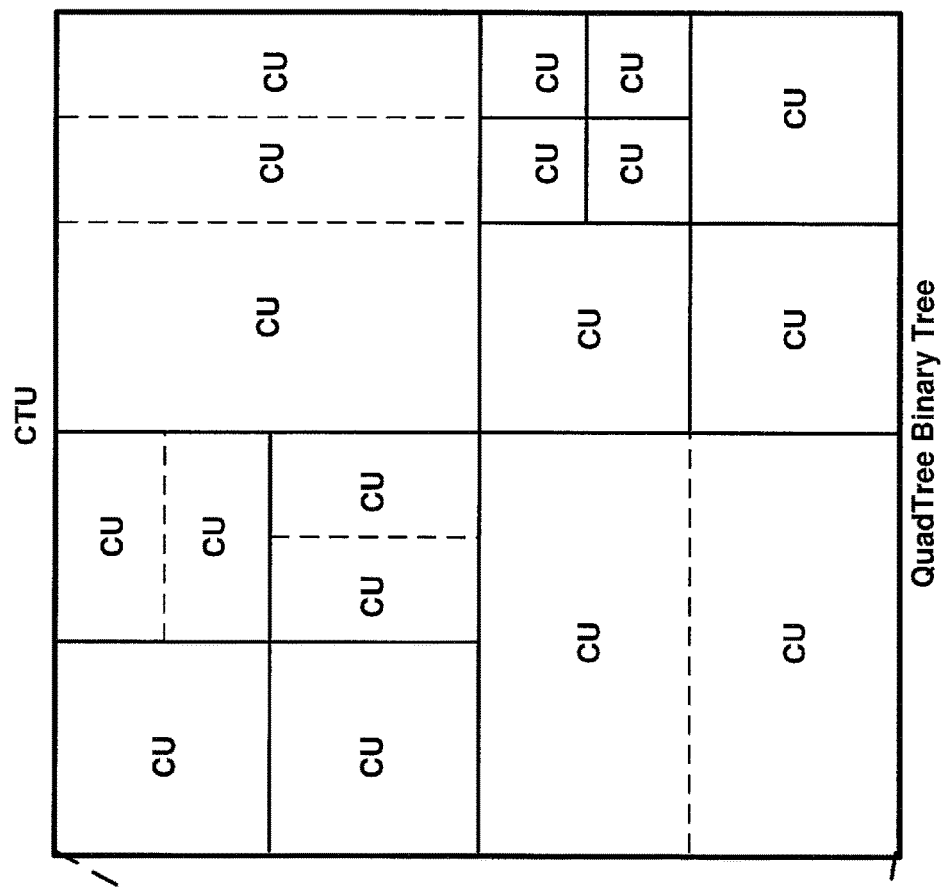
FIG. 1 is a conceptual diagram illustrating an example of a group of pictures coded according to a quad tree binary tree partitioning in accordance with one or more techniques of this disclosure.
Figure 1:
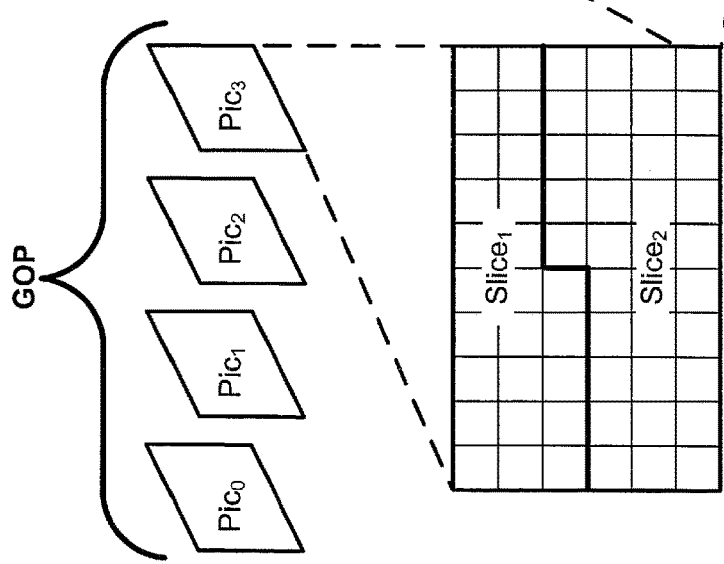

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel values and sample values are used interchangeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes. Further, the node may refer to a leaf node in some instances and a root node in some instances.

ITU-T H.264 specifies a macroblock including 16×16 luma samples. That is, in ITU-T H.264, a picture is segmented into macroblocks. ITU-T H.265 specifies an analogous Coding Tree Unit (CTU) structure. In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr)). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
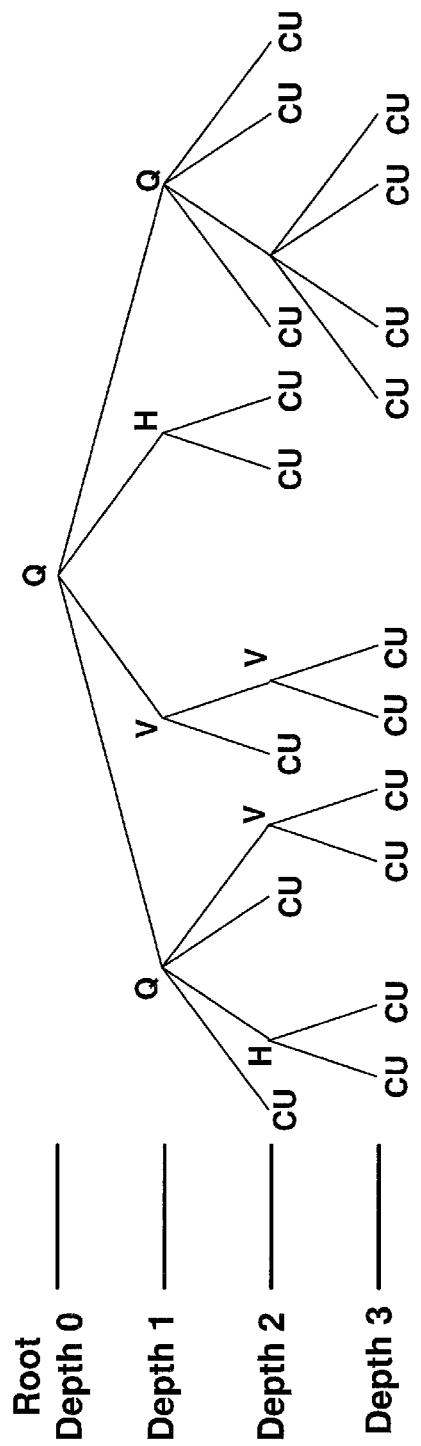
FIG. 2 is a conceptual diagram illustrating an example of a quad tree binary tree in accordance with one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice. FIG. 2 is a conceptual diagram illustrating an example of a QTBT corresponding to the example QTBT partition illustrated in FIG. 1.

In JEM, a QTBT is signaled by signaling QT split flag and BT split mode syntax elements. When a QT split flag has a value of 1, a QT split is indicated. When a QT split flag has a value of 0, a BT split mode syntax element is signaled. When a BT split mode syntax element has a value of 0 (i.e., BT split mode coding tree=0), no binary splitting is indicated. When a BT split mode syntax element has a value of 1 (i.e., BT split mode coding tree=11), a vertical split mode is indicated. When a BT split mode syntax element has a value of 2 (i.e., BT split mode coding tree=10), a horizontal split mode is indicated. Further, BT splitting may be performed until a maximum BT depth is reached. Thus, according to JEM, the QTBT illustrated in FIG. 2 may be signaled based on the pseudo-syntax provided in Table 1:

TABLE 1

```
QT flag = 1; //Depth 0 syntax
    QT flag = 1; //Depth 1 syntax
        QT flag = 0, BT split = 0; //Depth 2 syntax
        QT flag = 0, BT split = 2; //Depth 2 syntax
            BT split = 0; //Depth 3 syntax
            BT split = 0; //Depth 3 syntax
        QT flag = 0, BT split = 0; //Depth 2 syntax
        QT flag = 0, BT split = 1; //Depth 2 syntax
            BT split = 0; //Depth 3 syntax
            BT split - 0; //Depth 3 syntax
    QT flag = 0; BT split = 1; //Depth 1 syntax
        BT split = 0; //Depth 2 syntax
        BT split = 1; //Depth 2 syntax
            BT split = 0; //Depth 3 syntax
            BT split = 0; //Depth 3 syntax
    QT flag = 0; BT split = 2; //Depth 1 syntax
        BT split = 0; //Depth 2 syntax
        BT split = 0; //Depth 2 syntax
    QT flag = 1; //Depth 1 syntax
        QT flag = 0, BT split = 0; //Depth 2 syntax
        QT flag = 1; //Depth 2 syntax
            QT flag = 0, BT split = 0; //Depth 3 syntax
            QT flag = 0, BT split = 0; //Depth 3 syntax
            QT flag = 0, BT split = 0; //Depth 3 syntax
            QT flag = 0, BT split = 0; //Depth 3 syntax
        QT flag = 0, BT split = 0; //Depth 2 syntax
        QT flag = 0, BT split = 0. //Depth 2 syntax
```

In one example, when a maximum QT depth is reached the signaling of QT flag may be skipped and its value may be inferred, e.g., as 0. In one example, when a current depth is smaller than a minimum QT depth, then the signaling of a QT flag may be skipped and its value may be inferred, e.g., as 1. In one example, when a maximum depth is reached for the signaling of a partition type, then the associated syntax element may not be signaled in the bitstream and its value may be inferred. In one example, when a minimum depth for the signaling of a partition type is not yet reached, then the associated syntax element may not be signaled in the bitstream and its value may be inferred. In one example, when no QT split is allowed and when the current depth is smaller than minimum BT depth, then signaling of BT split may be modified to not allow BT split to equal 0.

Figure 3:
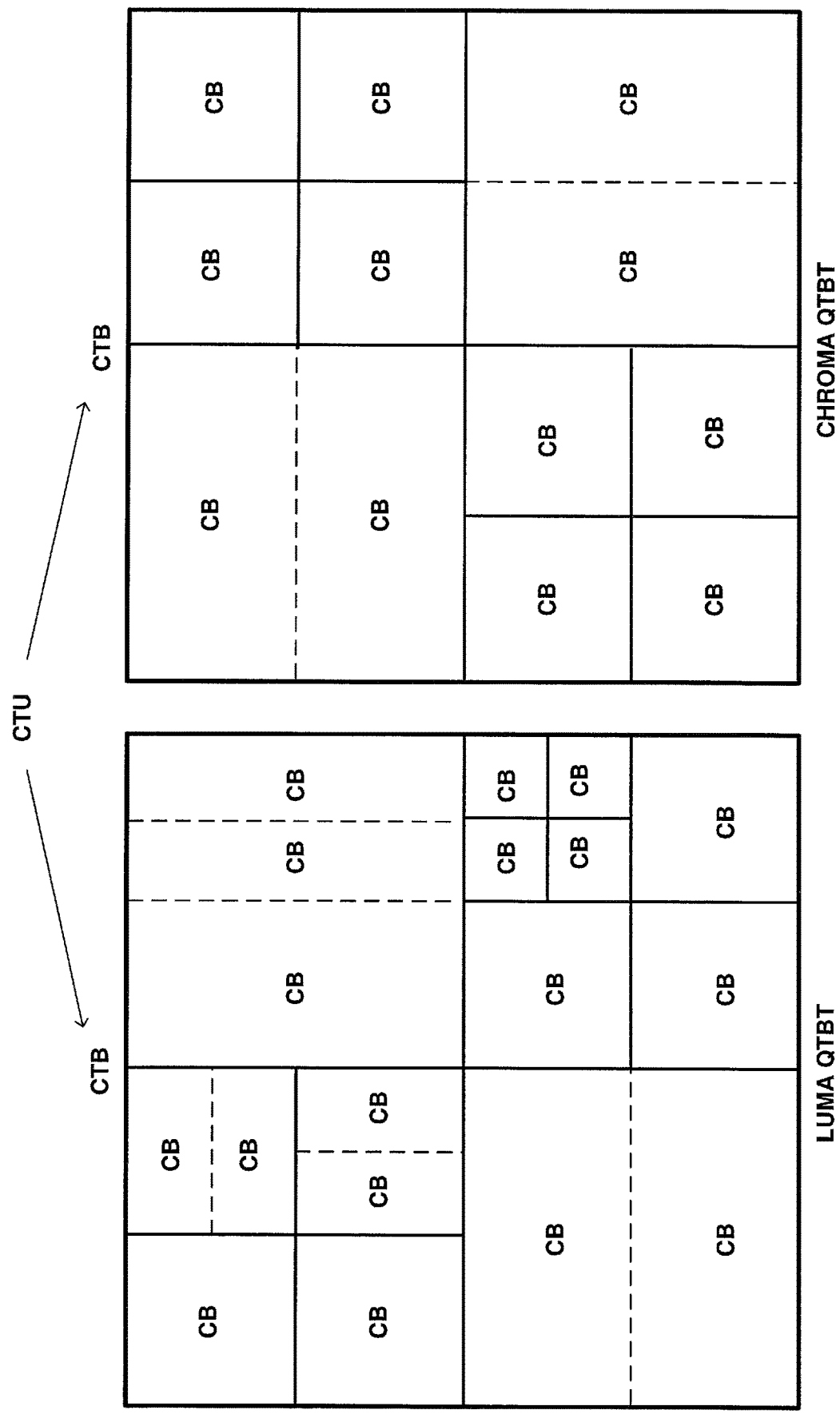
FIG. 3 is a conceptual diagram illustrating video component quad tree binary tree partitioning in accordance with one or more techniques of this disclosure.

As illustrated in FIG. 2 and Table 1, QT split flag syntax elements and BT split mode syntax elements are associated with a depth, where a depth of zero corresponds to a root of a QTBT and higher value depths correspond to subsequent depths beyond the root. Further, in JEM, luma and chroma components may have separate QTBT partitions. That is, in JEM luma and chroma components may be partitioned independently by signaling respective QTBTs. FIG. 3 illustrates an example of a CTU being partitioned according to a QTBT for a luma component and an independent QTBT for chroma components. As illustrated in FIG. 3, when independent QTBTs are used for partitioning a CTU, CBs of the luma component are not required to and do not necessarily align with CBs of chroma components. Currently, in JEM independent QTBT structures are enabled for intra prediction slices.

It should be noted that JEM includes the following parameters for signaling of a QTBT tree:

CTU size: the root node size of a quadtree (e.g., 256×256, 128×128, 64×64, 32×32, 16×16 luma samples);

MinQTSize: the minimum allowed quadtree leaf node size (e.g., 16×16, 8×8 luma samples);

MaxBTSize: the maximum allowed binary tree root node size, i.e., the maximum size of a leaf quadtree node that may be partitioned by binary splitting (e.g., 64×64 luma samples);

MaxBTDepth: the maximum allowed binary tree depth, i.e., the lowest level at which binary splitting may occur, where the quadtree leaf node is the root (e.g., 3);

MinBTSize: the minimum allowed binary tree leaf node size; i.e., the minimum width or height of a binary leaf node (e.g., 4 luma samples).

It should be noted that in some examples, MinQTSize, MaxBTSize, MaxBTDepth, and/or MinBTSize may be different for the different components of video.

In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 4:
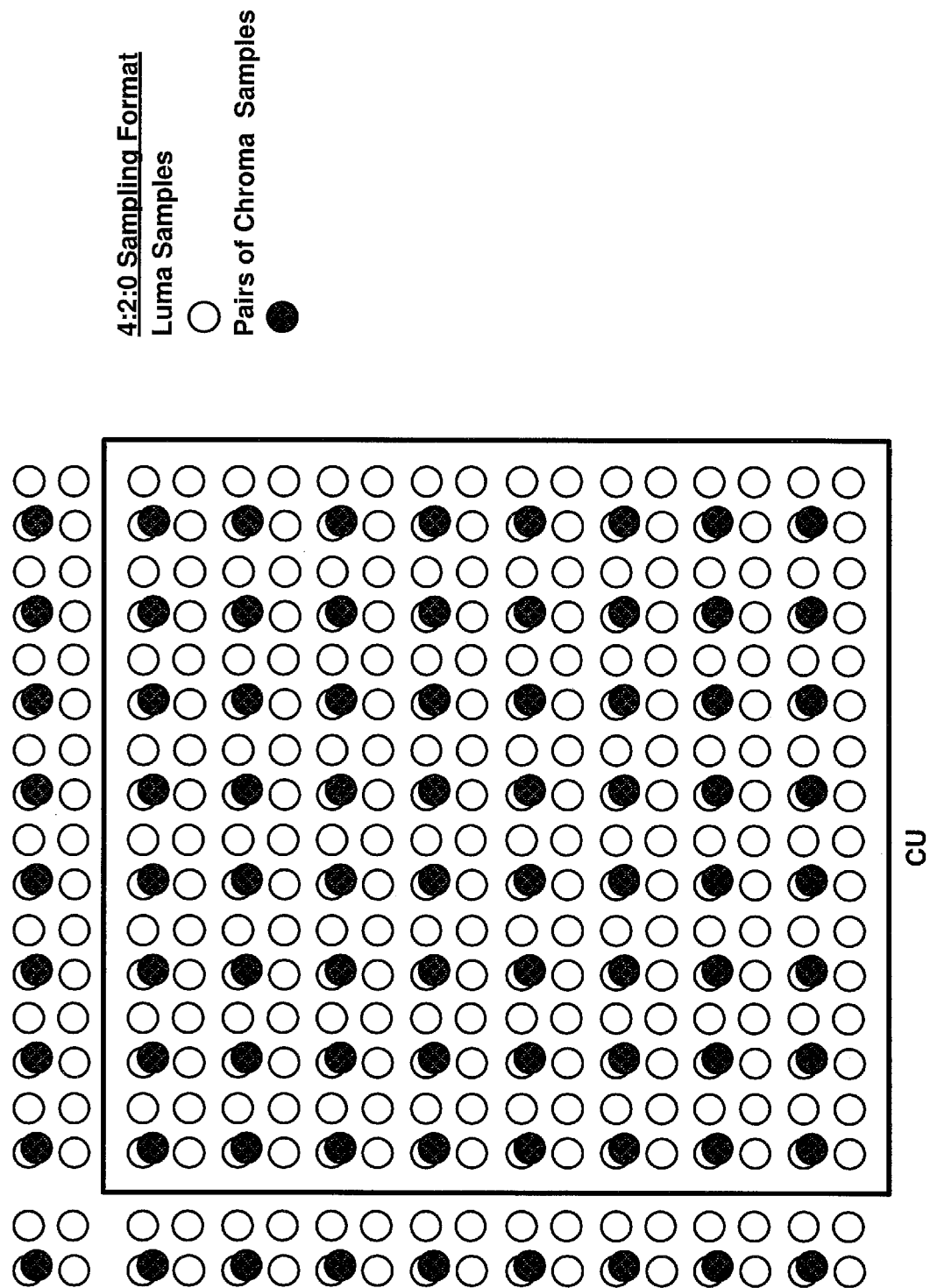
FIG. 4 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in the example illustrated in FIG. 4, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Figure 5:
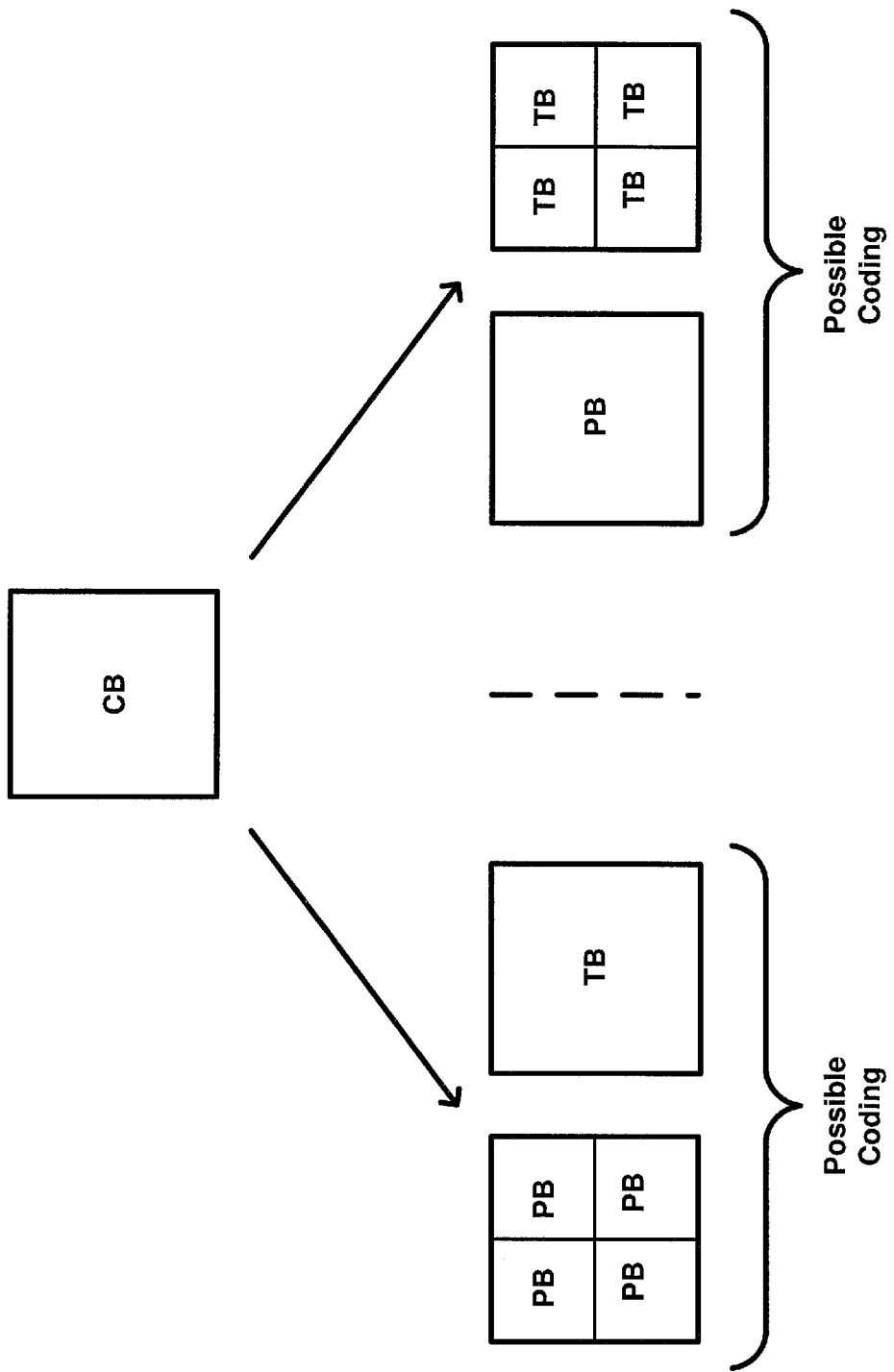
FIG. 5 is a conceptual diagram illustrating possible coding structures for a block of video data according to one or more techniques of this disclosure.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 5 illustrates examples of alternative PB and TB combinations that may be used for coding a particular CB. Further, it should be noted that in ITU-T H.265, TBs may have the following sizes 4×4, 8×8, 16×16, and 32×32.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Figure 6A:
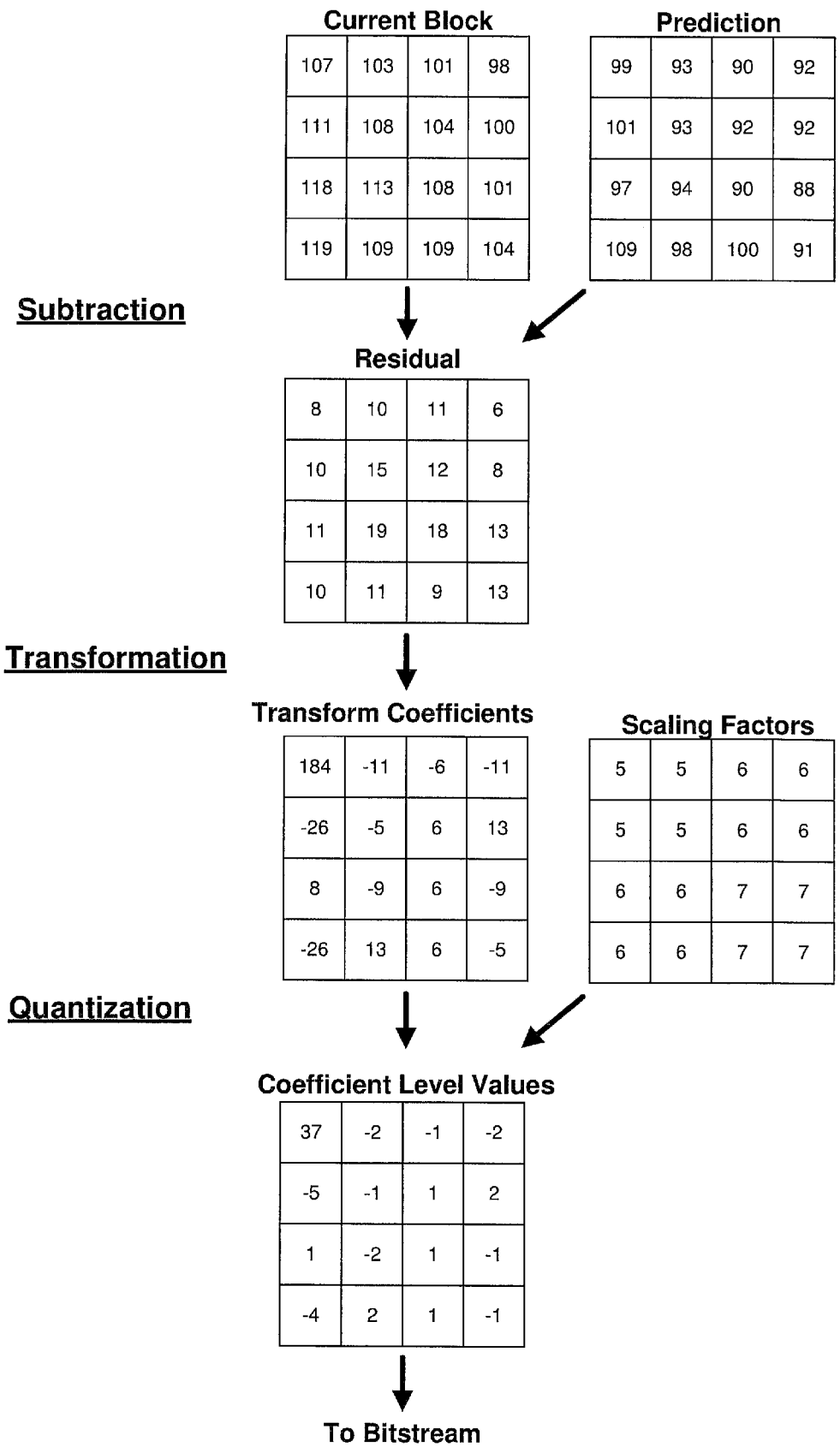
FIG. 6A is conceptual diagram illustrating examples of coding a block of video data in accordance with one or more techniques of this disclosure.
Figure 6B:
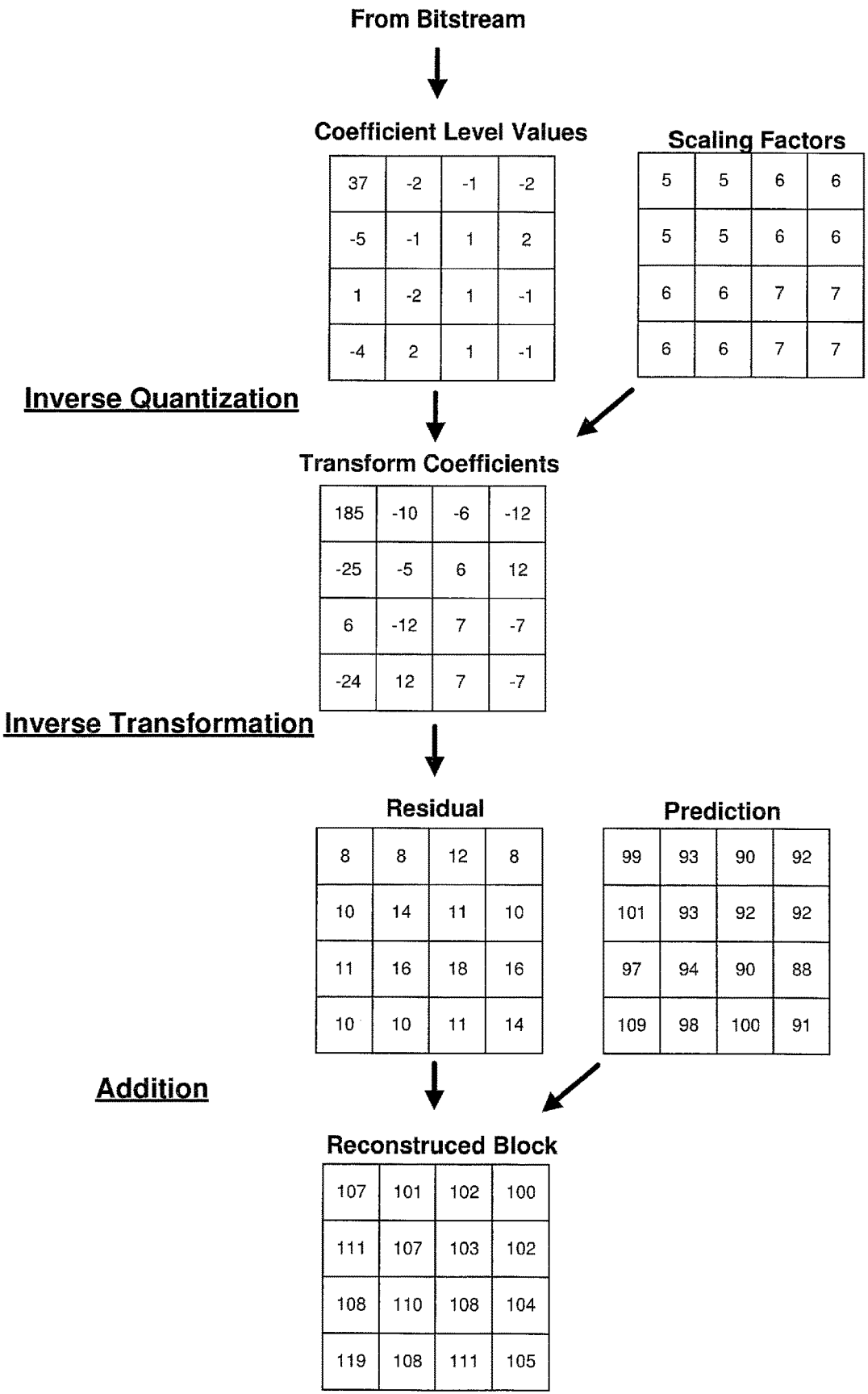
FIG. 6B is conceptual diagram illustrating examples of coding a block of video data in accordance with one or more techniques of this disclosure.

FIGS. 6A-6B are conceptual diagrams illustrating examples of coding a block of video data. As illustrated in FIG. 6A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 6B, the current block of video data is decoded by performing inverse quantization on level values, performing an inverse transform, and adding a set of prediction values to the resulting residual. It should be noted that in the examples in FIGS. 6A-6B, the sample values of the reconstructed block differs from the sample values of the current video block that is encoded. In this manner, coding may said to be lossy. However, the difference in sample values may be considered acceptable or imperceptible to a viewer of the reconstructed video. Further, as illustrated in FIGS. 6A-6B, scaling is performed using an array of scaling factors.

In ITU-T H.265, an array of scaling factors is generated by selecting a scaling matrix and multiplying each entry in the scaling matrix by a quantization scaling factor. In ITU-T H.265, a scaling matrix is selected based on a prediction mode and a color component, where scaling matrices of the following sizes are defined: 4×4, 8×8, 16×16, and 32×32. Thus, it should be noted that ITU-T H.265 does not define scaling matrices for sizes other than 4×4, 8×8, 16×16, and 32×32. In ITU-T H.265, the value of a quantization scaling factor, may be determined by a quantization parameter, QP. In ITU-T H.265, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a quantization parameter may be derived for each of luma (Y) and chroma (Cb and Cr) components.

As illustrated in FIG. 6A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, the sample values of a reconstructed block may differ from the sample values of the current video block that is encoded. Further, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize the difference between the sample values of the current video block that is encoded and/or minimize artifacts introduced by the video coding process. Such modifications may general be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at video encoder and subsequent decoding at a video decoder). For a post-loop filtering process the resulting sample values of a filtering process are merely output as part of the decoding process (e.g., not used for subsequent coding). For example, in the case of a video decoder, for an in-loop filtering process, the sample values resulting from filtering the reconstructed block would be used for subsequent decoding (e.g., stored to a reference buffer) and would be output (e.g., to a display). For a post-loop filtering process, the reconstructed block would be used for subsequent decoding and the sample values resulting from filtering the reconstructed block would be output.

Deblocking (or de-blocking), deblock filtering, or applying a deblocking filter refers to the process of smoothing the boundaries of neighboring reconstructed video blocks (i.e., making boundaries less perceptible to a viewer). Smoothing the boundaries of neighboring reconstructed video blocks may include modifying sample values included in rows or columns adjacent to a boundary. ITU-T H.265 provides where a deblocking filter is applied to reconstructed sample values as part of an in-loop filtering process. ITU-T H.265 includes two types deblocking filters that may be used for modifying luma samples: a Strong Filter which modifies sample values in the three adjacent rows or columns to a boundary and a Weak Filter which modifies sample values in the immediately adjacent row or column to a boundary and conditionally modifies sample values in the second row or column from the boundary. Further, ITU-T H.265 includes one type of filter that may be used for modifying chroma samples: Normal Filter.

In addition to applying a deblocking filter as part of an in-loop filtering process, ITU-T H.265 provides where Sample Adaptive Offset (SAO) filtering may be applied in the in-loop filtering process. In ITU-T H.265, SAO is a process that modifies the deblocked sample values in a region by conditionally adding an offset value. ITU-T H.265 provides two types of SAO filters that may be applied to a CTB: band offset or edge offset. For each of band offset and edge offset, four offset values are included in a bitstream. For band offset, the offset which is applied depends on the amplitude of a sample value (e.g., amplitudes are mapped to bands which are mapped to the four signaled offsets). For edge offset, the offset which is applied depends on a CTB having one of a horizontal, vertical, first diagonal, or second diagonal edge classification (e.g., classifications are mapped to the four signaled offsets).

Another type of filtering process includes the so-called adaptive loop filter (ALF). An ALF with block-based adaption is specified in JEM. In JEM, the ALF is applied after the SAO filter. It should be noted that an ALF may be applied to reconstructed samples independently of other filtering techniques. The process for applying the ALF specified in JEM at a video encoder may be summarized as follows: (1) each 2×2 block of the luma component for a reconstructed picture is classified according to a classification index; (2) sets of filter coefficients are derived for each classification index; (3) filtering decisions are determined for the luma component; (4) a filtering decision is determined for the chroma components; and (5) filter parameters (e.g., coefficients and decisions) are signaled.

According to the ALF specified in JEM, each 2×2 block is categorized according to a classification index C, where C is an integer in the inclusive range of 0 to 24. C is derived based on its directionality D and a quantized value of activity Â, according to the following equation:

$$C = 5D + \hat{A}$$

where D and Â, gradients of the horizontal, vertical and two diagonal direction are calculated using a 1-D Laplacian as follows:

$$g_v = \sum_{k=i-2}^{i+3} \sum_{l=j-2}^{j+3} V_{k,l}, \quad V_{k,l} = |2R(k,l) - R(k,l-1) - R(k,l+1)|,$$

$$g_h = \sum_{k=i-2}^{i+3} \sum_{l=j-2}^{j+3} H_{k,l}, \quad H_{k,l} = |2R(k,l) - R(k-1,l) - R(k+1,l)|,$$

$$g_{d1} = \sum_{k=i-2}^{i+3} \sum_{l=j-2}^{j+3} D1_{k,l}, \quad D1_{k,l} = |2R(k,l) - R(k-1,l-1) - R(k+1,l+1)|$$

$$g_{d2} = \sum_{k=i-2}^{i+3} \sum_{l=j-2}^{j+3} D2_{k,l}, \quad D2_{k,l} = |2R(k,l) - R(k-1,l+1) - R(k+1,l-1)|$$

where, indices i and j refer to the coordinates of the upper left sample in the 2×2 block and R(i,j) indicates a reconstructed sample at coordinate (i,j).

Maximum and minimum values of the gradients of horizontal and vertical directions may be set as:

$$g_{h,v}^{max} = \max(g_h, g_v);$$

$$g_{h,v}^{min} = \min(g_h, g_v).$$

and the maximum and minimum values of the gradient of two diagonal directions may be set as:

$$g_{d0,d1}^{max} = \max(g_{d0}, g_{d1});$$

$$g_{d0,d1}^{min} = \min(g_{d0}, g_{d1}).$$

In JEM, to derive the value of the directionality D, the maximum and minimum values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} \leq t_2 \cdot g_{h,v}^{min}$, D is set to 2; otherwise D is set to 1.

Step 4. If $g_{d0,d1}^{max} \leq t_2 \cdot g_{d0,d1}^{min}$, D is set to 4; otherwise D is set to 3.

In JEM, the activity value A is calculated as:

$$A = \sum_{k=i-2}^{i+3} \sum_{l=j-2}^{j+3} (V_{k,l} + H_{k,l}).$$

where, A is further quantized to the range of 0 to 4, inclusively, and the quantized value is denoted as Â.

As described above, applying the ALF specified in JEM at a video encoder includes deriving sets of filter coefficients for each classification index and determining filtering decisions. It should be noted that the derivation of sets of filter coefficients and determination of filtering decisions may be an iterative process. That is, sets of filter coefficients may be updated based on filtering decisions and filtering decisions may be updated based on updated sets of filter coefficients and this may be repeated multiple times. Further, a video encoder may implement various proprietary algorithms to determine sets of filter coefficients and/or to determine filtering decisions. The techniques described herein are generally applicable regardless of how sets of filter coefficients are derived for each classification index and how filtering decisions are determined.

According to one example, sets of filter coefficients are derived by initially deriving a set of optimal filter coefficients for each classification index. Optimal filter coefficients are derived by comparing desired sample values (i.e., sample values in the source video) to reconstructed sample values subsequent to applying the filtering and by minimizing the sum of squared errors (SSE) between the desired sample values and the reconstructed sample values subsequent to performing the filtering The derived optimal coefficients for each group may then be used to perform a basis filtering over the reconstructed samples in order to analyze the effectiveness of the ALF. That is, desired sample values, reconstructed sample values prior to applying the ALF, and reconstructed sample values subsequent to performing the ALF can be compared to determine the effectiveness of applying the ALF using the optimal coefficients.

According to the specified ALF in JEM, each reconstructed sample R(i,j) is filtered by determining the resulting in sample value R'(i,j) according to the following equation, wherein in the following equation below, L denotes filter length, and f(k,l) denotes the decoded filter coefficients.

$$R'(i,j) = \sum_{k=-L/2}^{L/2} \sum_{l=-L/2}^{L/2} f(k,l) \times R(i+k, j+l)$$

It should be noted that JEM defines three filter shapes (a 5×5 diamond, a 7×7 diamond, and a 9×9 diamond). It should be noted that the 9×9 diamond filter shape is typically used for the basis filtering.

It should be noted that in JEM, geometric transformations are applied to filter coefficients f(k,l) depending on gradient values: $g_v$, $g_h$, $g_{d1}$, $g_{d2}$, as provided in Table 2.

TABLE 2

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation | where the Diagonal, Vertical flip, and Rotation are defined as follows:
Diagonal: $f_D(k,l) = f(l,k)$,
Vertical flip: $f_V(k,l) = f(k, K-l-1)$
Rotation: $f_R(k,l) = f(K-l-1, k)$
where K is the size of the filter and 0≤k, l≤K-1 are coefficients coordinates, such that location (0,0) is at the upper left corner and location (K-1,K-1) is at the lower right corner.

JEM provides where up to 25 sets of luma filter coefficients can be signaled (i.e., one for each possible classification index). Thus, the optimal coefficients could be signaled for each classification index occurring in a corresponding picture region. However, in order to optimize the amount of data required to signal sets of luma filter coefficients versus the effectiveness of the filter, rate distortion (RD) optimizations may be performed. For example, JEM provides where sets of filter coefficients of neighboring classification groups may be merged and signaled using an array mapping a set of filter coefficients to each classification index. Further, JEM provides where temporal coefficient prediction may be used to signal coefficients. That is, JEM provides where sets of filter coefficients for a current picture may be predicted based on sets of filter coefficients of a reference picture by inheriting the set of filter coefficients used for a reference picture. JEM further provides where for intra prediction pictures, a set of 16 fixed filters may be available for predicting sets of filter coefficients. As described above, the derivation of sets of filter coefficients and determination of filtering decisions may be an iterative process. That is, for example, the shape of the ALF may be determined based on how many sets of filter coefficients are signaled and similarly, whether the ALF is applied to a region of a picture may be based on the sets of filter coefficients that are signaled and/or the shape of the filter.

As described above, the process for applying the ALF specified in JEM at a video encoder includes signaling filter parameters. That is, JEM provides signaling that is used by a video encoder to indicate the filter parameters to a video decoder. A video decoder may then apply the ALF to reconstructed sample values based on the indicated filter parameters. JEM provides where for the luma component a picture-level flag may enable an ALF to be selectively applied to each CU in a picture. Further, JEM provides where an index value signaled at the picture level indicates the filter shape that is selected for the luma component (i.e., a 5×5 diamond, a 7×7 diamond, or a 9×9 diamond). It should be noted that larger filter shapes are generally more accurate, but require a larger number of filter coefficients. Further, JEM provides where for the luma component filter coefficients are signaled at the slice level. As described above, filter coefficients may be signaled directly for one or more of the 25 groups or signaled using a prediction techniques. Further, JEM provides where for the chroma component the ALF is enabled or disabled at the picture level. It should be noted that in JEM, for the chroma components, the entire picture is treated as one class and the filter shape is always a 5×5 diamond, a single set of filter coefficients is applied for each chroma component, and there is no CU level. Further, it should be noted that if the ALF is not enabled for the luma component, then the ALF is disabled for the chroma components.

As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

In addition to generating reference samples according to a prediction mode (which may be referred to as an intra prediction block), intra prediction coding may include modifying reference samples prior to generating residual data (e.g., during encoding) and/or modifying reference samples prior to reconstructing a video block (e.g., during decoding). JEM specifies techniques for modifying reference samples prior to generating residual data and modifying references samples prior to reconstructing a video block. One technique specified in JEM for modifying reference samples includes generating a predictive video block using a weighted combination of unfiltered and filtered reference samples, i.e., so-called Position Dependent Intra Prediction (PDPC).

In PDPC, a predictive video block is generated according to the following equation, p[x,y] is a new prediction. In the equation, r[x,y] represents reference samples generated for a directional prediction mode using unfiltered reference samples and q[x,y] represents reference samples generated for the directional prediction mode using filtered reference samples.

$$p[x,y]=\{(c_1^{(v)}>>\lfloor y/d_y \rfloor)r[x,-1]-(c_2^{(v)}>>\lfloor y/d_y \rfloor)r[-1,-1]+(c_1^{(h)}>>\lfloor x/d_x \rfloor)r[-1,y]-(c_2^{(h)}>>\lfloor x/d_x \rfloor)r[-1,-1]+b[x,y]q[x,y]+64\}>>7$$

where $c_1^v$, $c_2^v$, $c_1^h$, $c_2^h$ are stored prediction parameters, $d_x=1$ for blocks with width smaller than or equal to 16 and $d_x=2$ for blocks with width larger than 16, $d_y=1$ for blocks with height smaller than or equal to 16 and $d_y=2$ for blocks with height larger than 16. b[x, y] is a normalization factor derived as follow:

$$b[x,y]=128-(c_1^{(v)}>>\lfloor y/d_y \rfloor)+(c_2^{(v)}>>\lfloor y/d_y \rfloor)-(c_1^{(h)}>>\lfloor x/d_x \rfloor)+(c_2^{(h)}>>\lfloor x/d_x \rfloor)$$

Where the x>>y operation represents an arithmetic right shift of a two's complement integer representation of x by y binary digits; and ⌊x⌋ returns the closest integer less than or equal to x.

The prediction parameters, $c_1^v$, $c_2^v$, $c_1^h$, $c_2^h$ are defined per prediction direction and block size. In JEM, one set of prediction parameters is defined per intra prediction mode and block size.

Further, it should be noted that in JEM, a CU level flag, PDPC_idx, indicates whether PDPC is applied or not, where a value of 0 indicates that an existing ITU-T H.265 intra prediction is used and a value of 1 indicates the PDPC is applied.

Further, JEM provides a reference sample filtering mechanism, i.e., so-called Adaptive Reference Sample Smoothing (ARSS). As provided in JEM, in ARSS, two low pass filters (LPF) are used to process reference samples: a 3-tap LPF with the coefficients of [1, 2, 1]/4; and a 5-tap LPF with the coefficients of [2, 3, 6, 3, 2]/16. As provided in JEM, for the ARSS, a defined set of rules are used to determine which of the following applies (1) reference samples are not filtered; (2) reference samples are filters according to ITU-T H.265 rules (with modifications in some cases); (3) reference samples are filtered using the 3-tap LPF; or (4) reference samples are filtered using the 5-tap LPF. In JEM, ARSS is applied only for the luma component, in case that CU size is smaller than or equal to 1024 luma samples and larger than or equal to 64 luma samples, at least one coefficient subgroup in the luma coding block has a sign bit hidden and the intra prediction mode is not DC mode. Further, in JEM, when PDPC flag is equal to 1 for a CU, adaptive reference samples smoothing is disabled in this CU.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

As described above, residual data generated for an area of a picture using a prediction and corresponding reference samples may be transformed to generate transform coefficients. Transform coefficients may be generated using transform matrices associated with a transform set. In JEM, in addition to using the DCT-II and 4×4 DST-VII transform types that are used in ITU-T H.265, an Adaptive Multiple Transform (AMT) scheme is used for residual coding for both inter and intra coded blocks. In JEM, the AMT using the following transform matrices DST-VII, DCT-VIII, DST-I and DCT-V. Each transform matrix in JEM may be implemented using horizontal (H) and a vertical (V) transform. In JEM, the AMT applies to the CUs with both width and height smaller than for equal to 64, and whether AMT applies or not is controlled by a CU level flag. When the CU level flag is equal to 0, DCT-II is applied in the CU to transform the residual. For luma coding block within an AMT enabled CU, two additional flags are signaled to identify the horizontal and vertical transform to be used.

In JEM, for intra prediction, three predefined set of transform candidates are defined as provided in Table 3.

TABLE 3

| Transform Set | Transform Candidates |
|---|---|
| 0 | DST-VII, DCT-VIII |
| 1 | DST-VII, DST-I |
| 2 | DST-VII, DCT-VIII |

In JEM, a transform set is selected based on an intra prediction mode as provided in Table 4.

TABLE 4

| Intra mode | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| H | 2 | 1 | 0 | 1 | 0 | 1 | 0 | 1 | 0 | 0 | 0 | 0 | 0 | 1 | 0 | 1 | 0 | 1 | 0 |
| V | 2 | 1 | 0 | 1 | 0 | 1 | 0 | 1 | 2 | 2 | 2 | 2 | 2 | 1 | 0 | 1 | 0 | 1 | 0 |
| Intra mode | 19 | 20 | 21 | 22 | 23 | 24 | 25 | 26 | 27 | 28 | 29 | 30 | 31 | 32 | 33 | 34 | | | |
| H | 1 | 0 | 1 | 0 | 1 | 2 | 2 | 2 | 2 | 2 | 1 | 0 | 1 | 0 | 1 | 0 | | | |
| V | 1 | 0 | 1 | 0 | 1 | 0 | 0 | 0 | 0 | 0 | 1 | 0 | 1 | 0 | 1 | 0 | | | |

Thus, in JEM for intra prediction, a transform subset is first identified based on Table 3 using the intra prediction mode of a CU with the CU-level AMT flag is equal to 1 and for each of the horizontal and vertical transform, one of the two transform candidates in the identified transform subset is determined.

As further described above, in JEM, whether a subsequent secondary transform is applied to generate transform coefficients may be dependent on a prediction mode. In JEM, applying a subsequent secondary transform may include performing a secondary transform independently for each 4×4 sub-group of transform coefficients, performing a secondary transform independently may be referred to as applying mode dependent Non-Separable Secondary Transform (MDNSST). It should be noted that in JEM, if both the width and height of a transform coefficient block is larger than or equal to 8, then a 8×8 non-separable secondary transform is applied to the top-left 8×8 region of the transform coefficients block and, if either the width or height of a transform coefficient block is equal to 4, a 4×4 non-separable secondary transform is applied and the 4×4 non-separable transform is performed on the top-left region of the transform coefficient block. In JEM, the transform selection rule is applied for both luma and chroma components. In JEM for the MDNSST, there are 35 non-separable transform matrices, where 11 is the number of transform sets for the directional intra prediction mode and each transform set includes 3 transform matrices and for non-directional modes, (i.e., Planar, DC and LM) only one transform set is applied which includes 2 transform matrices. In JEM each transform set is mapped to a prediction mode and a 2-bit CU-level index value (referred to as "NSST_idx" herein) is included in the bitstream to indicate a transform matrix for a transform set. It should be noted that in JEM, NSST_idx is signaled once per intra CU and is included in a bitstream after the corresponding transform coefficients. Further, in JEM, a value of zero for NSST_idx indicates that a secondary transform is not applied to the current CU. It should be noted that in JEM, MDNSST is only enabled when PDPC is not applied (i.e., the value of PDPC_idx is set equal to zero).

As described above, in JEM, a QTBT leaf node, which allows for arbitrary rectangular CBs, may be analogous to both a PB and a TB in ITU-T H.265. Thus, is some cases, JEM may provide less flexibility with respect to possible PB and TB structures than as provided in ITU-T H.265. As further described above, in ITU-T H.265, only square TBs are allowed and only limited PB shape are allowed (e.g., only square PBs are allowed for intra prediction). Thus, partitioning and associated signaling as defined ITU-T H.265 and JEM may be less than ideal. This disclosure describes techniques for partitioning video data.

Figure 7:
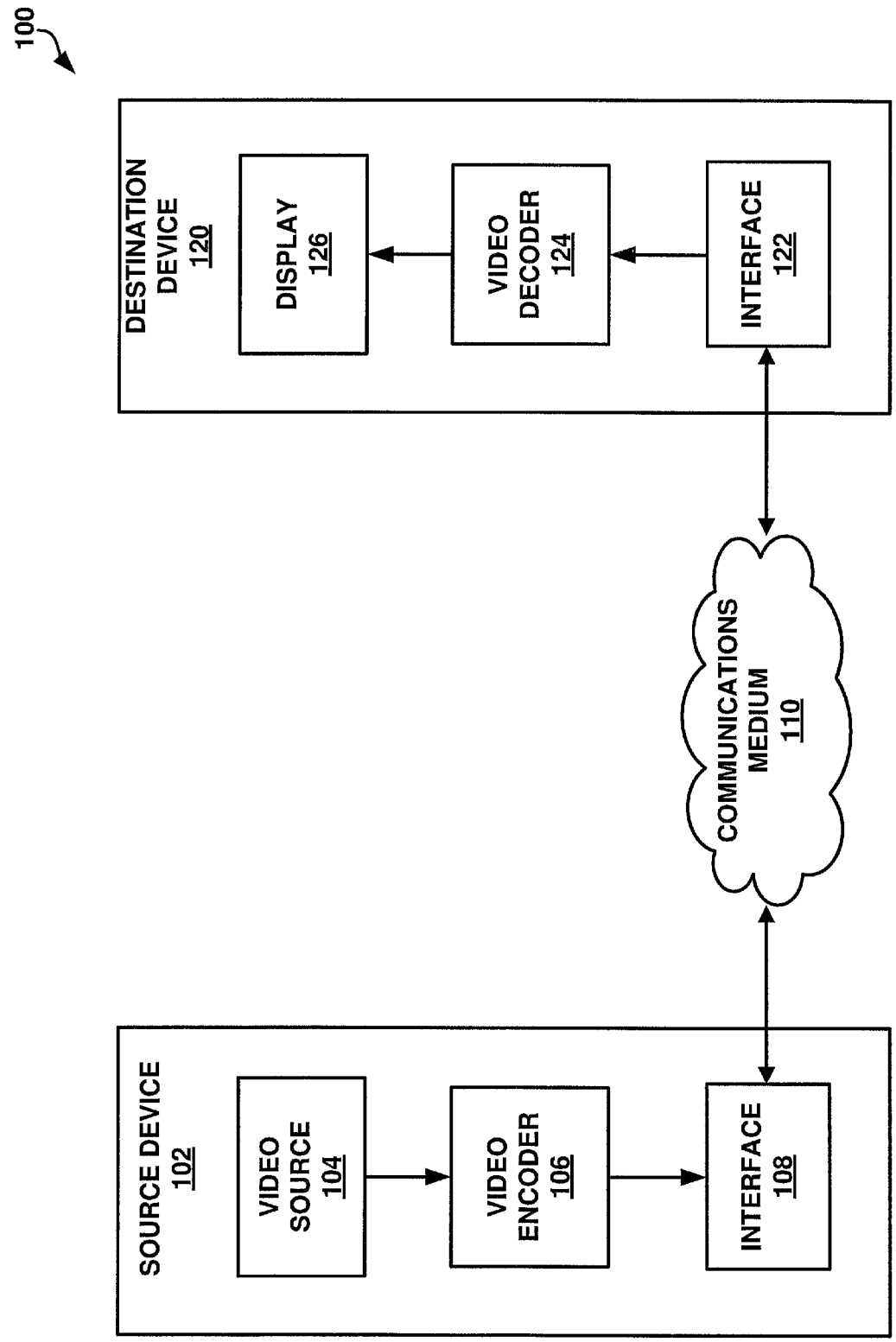
FIG. 7 is a block diagram illustrating an example of a system that may be configured to encode and decode video data according to one or more techniques of this disclosure.

FIG. 7 is a block diagram illustrating an example of a system that may be configured to code (i.e., encode and/or decode) video data according to one or more techniques of this disclosure. System 100 represents an example of a system that may perform video coding using arbitrary rectangular video blocks according to one or more techniques of this disclosure. As illustrated in FIG. 7, system 100 includes source device 102, communications medium 110, and destination device 120. In the example illustrated in FIG. 7, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 7, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 7, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 7, video decoder 124 is described as outputting data to display 126, video decoder 124 may be configured to output video data to various types of devices and/or sub-components thereof. For example, video decoder 124 may be configured to output video data to any communication medium, as described herein.

Figure 8:
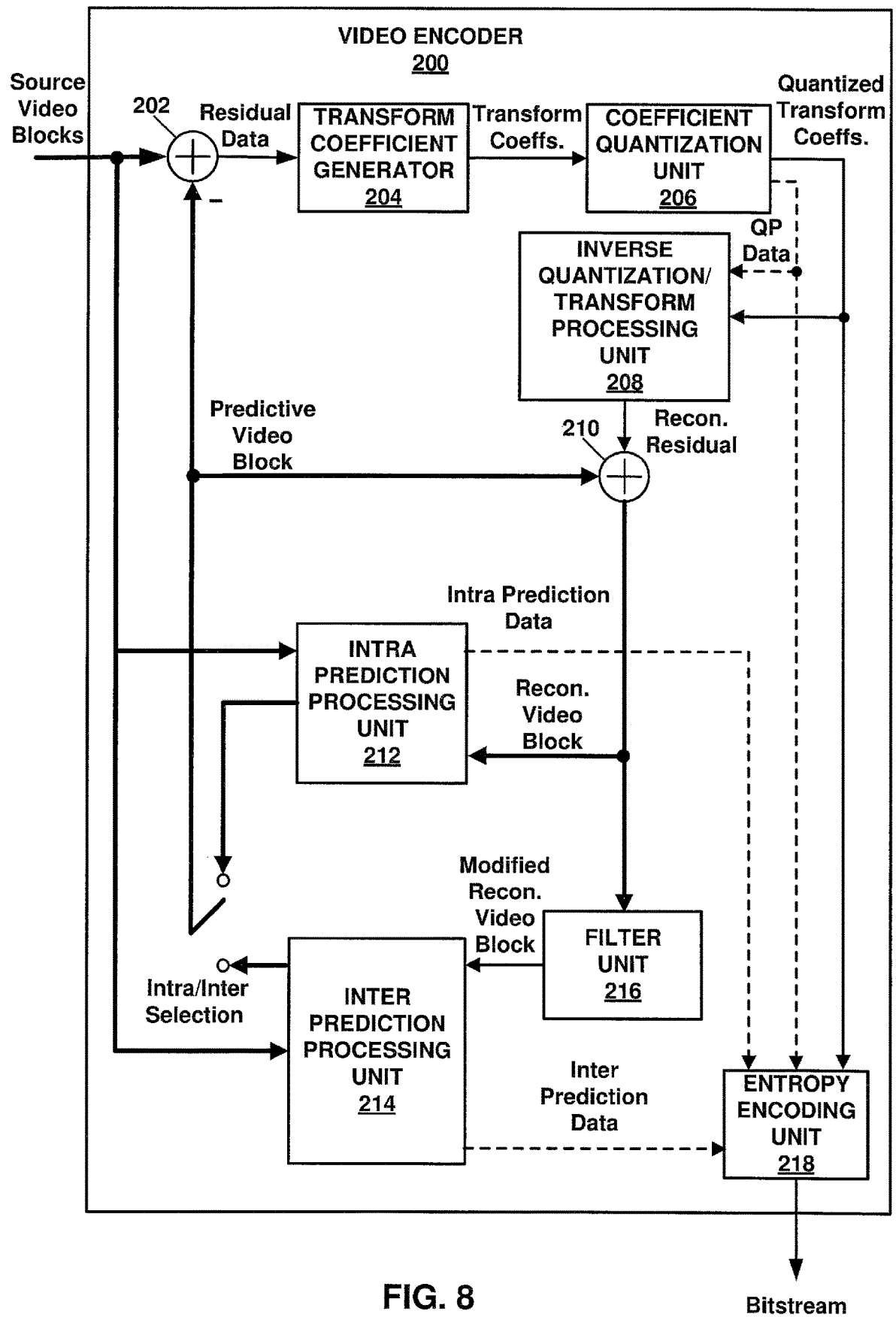
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 8, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 8, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 8, video encoder 200 receives source video blocks and outputs a bitstream. As described above, JEM includes the following parameters for signaling of a QTBT tree: CTU size, MinQTSize, MaxBTSize, MaxBTDepth, and MinBTSize. Table 5 illustrates block sizes of QT leaf nodes at various QT depths for different CTU sizes (in the example, MinQTSize is 8). Further, Table 6 illustrates allowed block sizes of BT leaf nodes at various BT depths for binary tree root node sizes (i.e., leaf quadtree node sizes).

TABLE 5

| | | CTU size | | | | |
|---|---|---|---|---|---|---|
| | | 256 × 256 | 128 × 128 | 64 × 64 | 32 × 32 | 16 × 16 |
| QT Depth | 0 | 256 × 256 | 128 × 128 | 64 × 64 | 32 × 32 | 16 × 16 |
| | 1 | 128 × 128 | 64 × 64 | 32 × 32 | 16 × 16 | 8 × 8 |
| | 2 | 64 × 64 | 32 × 32 | 16 × 16 | 8 × 8 | |
| | 3 | 32 × 32 | 16 × 16 | 8 × 8 | | |
| | 4 | 16 × 16 | 8 × 8 | | | |
| | 5 | 8 × 8 | | | | |

TABLE 6

| | | Block Size of QT leaf CB | | | | |
|---|---|---|---|---|---|---|
| | | 128 × 128 | 64 × 64 | 32 × 32 | 16 × 16 | 8 × 8 |
| BT depth | 1 | 128 × 64 | 64 × 32 | 32 × 16 | 16 × 8 | 8 × 4 |
| | | 64 × 128 | 32 × 64 | 16 × 32 | 8 × 16 | 4 × 8 |
| | 2 | 64 × 64 | 32 × 32 | 16 × 16 | 8 × 8 | 4 × 4 |
| | | 128 × 32 | 64 × 16 | 32 × 8 | 16 × 4 | 8 × 2 |
| | | 32 × 128 | 16 × 64 | 8 × 32 | 4 × 16 | 2 × 8 |
| | 3 | 64 × 32 | 32 × 16 | 8 × 16 | 8 × 4 | |
| | | 32x × 64 | 16 × 32 | 16 × 8 | 4 × 8 | |
| | | 128 × 16 | 64 × 8 | 32 × 4 | 16 × 2 | |
| | | 16 × 128 | 8 × 32 | 4 × 32 | 2 × 16 | |

Thus, referring to Table 5, the quadtree node size, which forms the root of the binary tree, may be determined based on CTU size and a QT Depth. If the quadtree is further split into binary trees, then binary tree leaf node sizes may be determined based on QT node size and BT depth, as illustrated in Table 6. Each of MaxBTSize, MaxBTDepth, and MinBTSize may be used to determine a minimum allowed binary tree leaf node size. For example, if CTU size is 128×128, QT Depth is 3, MaxBTSize is 16×16, and MaxBTDepth is 2, the minimum allowed binary tree leaf node size includes 64 samples (i.e., 8×8, 16×4, or 4×16). In this case, if MaxBTDepth is 1, the minimum allowed binary tree leaf node size includes 128 samples (i.e., 16×8 or 8×16). Table 7 illustrates block sizes of BT leaf nodes at various combinations of QT depths and BT depths for a CTU size of 128×128.

TABLE 7

| | | QT Depth | | | | |
|---|---|---|---|---|---|---|
| | | 0 | 1 | 2 | 3 | 4 |
| BT Depth | 0 | 128 × 128 | 64 × 64 | 32 × 32 | 16 × 16 | 8 × 8 |
| | 1 | 128 × 64 | 64 × 32 | 32 × 16 | 16 × 8 | 8 × 4 |
| | | 64 × 128 | 32 × 64 | 16 × 32 | 8 × 16 | 4 × 8 |
| | 2 | 64 × 64 | 32 × 32 | 16 × 16 | 8 × 8 | 4 × 4 |
| | | 128 × 32 | 64 × 16 | 32 × 8 | 16 × 4 | 8 × 2 |
| | | 32 × 128 | 16 × 64 | 8 × 32 | 4 × 16 | 2 × 8 |
| | 3 | 64 × 32 | 32 × 16 | 8 × 16 | 8 × 4 | |
| | | 32 × 64 | 16 × 32 | 16 × 8 | 4 × 8 | |
| | | 128 × 16 | 64 × 8 | 32 × 4 | 16 × 2 | |
| | | 16 × 128 | 8 × 32 | 4 × 32 | 2 × 16 | |

As described above, QTBT partitioning and associated signaling as defined in JEM may be less than ideal. In some examples, according to the techniques described herein, video encoder 200 may be configured to partition CTUs such that luma and chroma channels have a common partitioning structure up to a CU level, where a prediction type (e.g., intra or inter or skip mode) is associated with the CU. Further, depending on the prediction type (e.g., intra or inter or skip mode) one or both of the luma and chroma channels may be further partitioned. In one example, luma and chroma channels have a common partitioning structure up to a CU level and if a prediction type of intra is associated with the CU one or both of the luma and chroma channels may be further partitioned. It should be noted that in the examples below, a CU level refers to a leaf of the shared QTBT which forms the root for further partitioning of the luma and chroma channels. It should be noted that in one example, whether or not the luma and chroma channels may be partitioned beyond the CU level may be explicitly signaled (e.g., using a flag at the CTU level or a flag at the level in a partition tree where a prediction type is signaled) or may be inferred based on properties of video data (e.g., a CTU size). It should be noted that for a slice of video data having an intra type (which may be referred to as an intra prediction slice), only intra prediction modes are enabled and for a slice of video data having an inter type (which may be referred to as an inter prediction slice), both intra prediction modes and inter prediction modes are enabled. In one example, different partition schemes may be employed for intra slices and inter slices. For example, in one example, for intra slices, independent QTBTs may be used for the luma channel and the chroma channel and for inter slices, the luma channel and the chroma channel may be partitioned according to the techniques described herein. Further, it should be noted that in one example, various other techniques (e.g., techniques provided in ITU-T H.265) may be used to partition intra slices and for inter slices, the luma channel and the chroma channel may be partitioned according to the techniques described herein.

Figure 9:
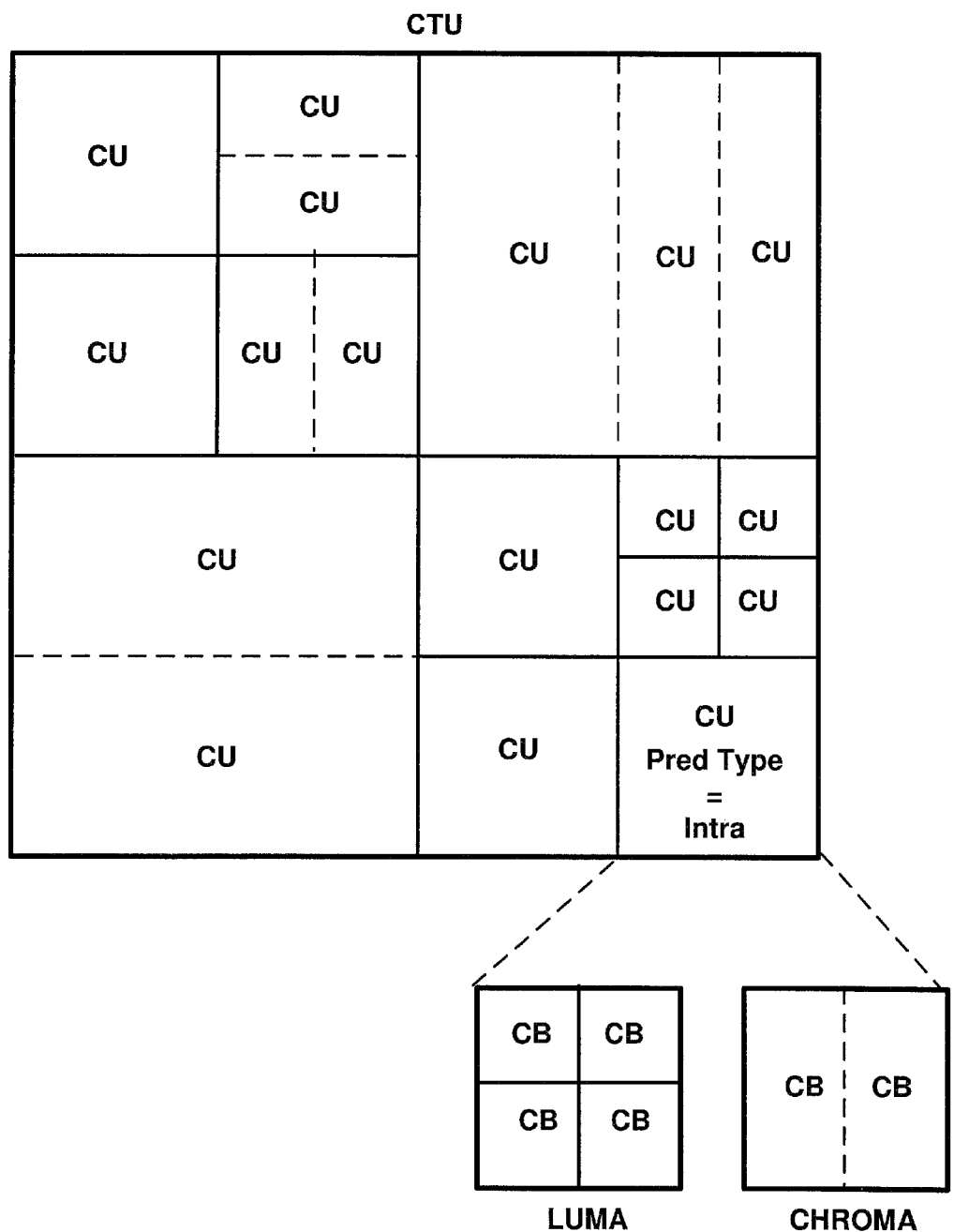
FIG. 9 is a conceptual diagram illustrating video component partitioning in accordance with one or more techniques of this disclosure.
Figure 10:
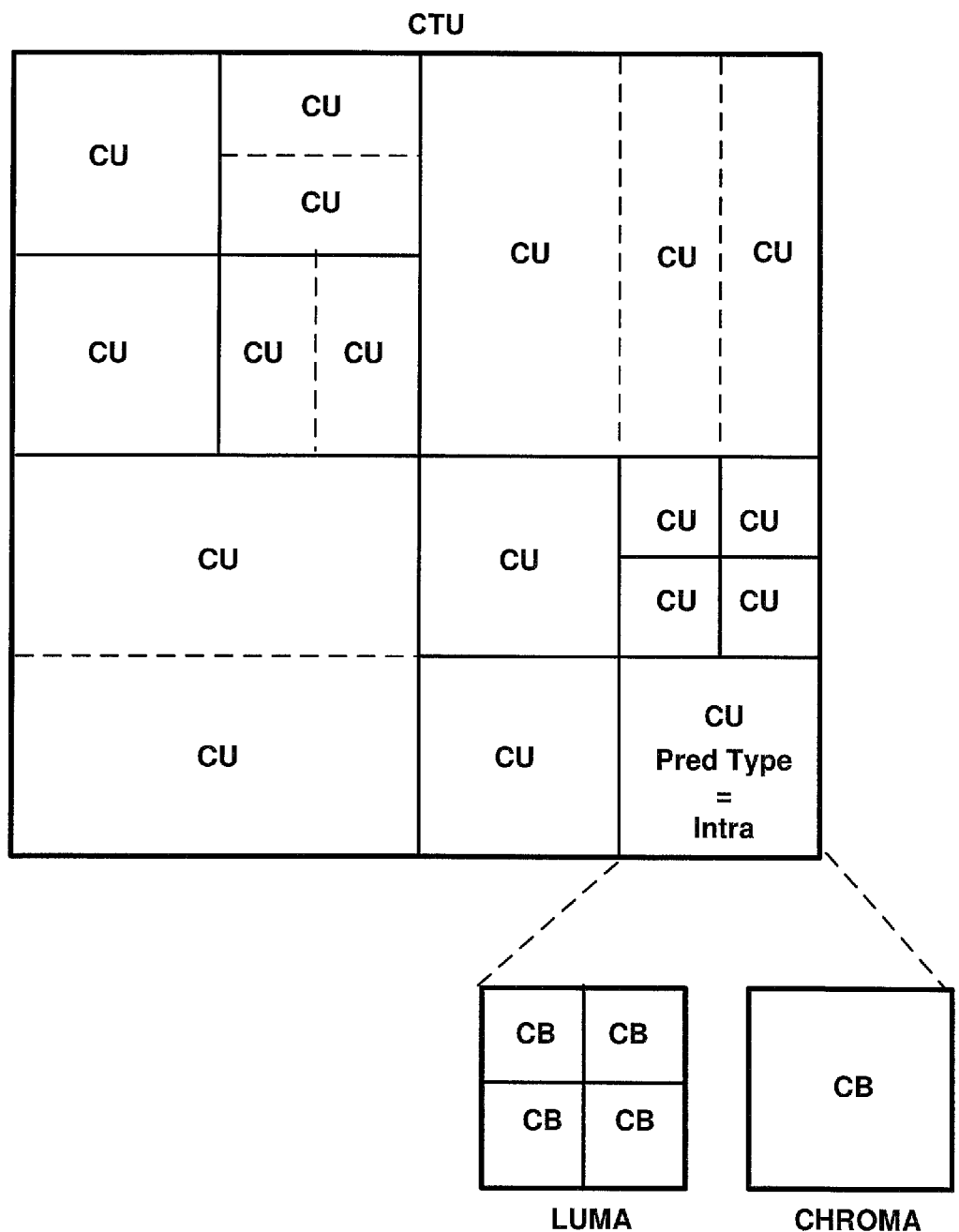
FIG. 10 is a conceptual diagram illustrating video component partitioning in accordance with one or more techniques of this disclosure.

FIGS. 9 and 10 are conceptual diagrams illustrating video component partitioning in accordance with one or more techniques of this disclosure. FIG. 9 illustrates an example where for a CTU included in an inter slice, luma and chroma channels have a common partitioning structure up to the CU level, and in the case where an intra prediction type is specified for the CU, the luma and chroma channels may be further partitioned. FIG. 10 illustrates an example where for a CTU included in an inter slice, luma and chroma channels have a common partitioning structure up to the CU level, and in the case where a intra prediction type is specified for the CU, the luma channel may be further partitioned. It should be noted with respect to FIGS. 9 and 10, for the sake of simplicity of illustration, only one of the CUs is illustrated as having an intra prediction type and the other CUs have inter predictions types. It should be noted that any combination intra or inter prediction types may be associated with respective CUs in a CTU. In the examples illustrated in FIGS. 9 and 10, each illustrated CB may be a block of sample values for which the same prediction is applied. That is, the CBs illustrated in FIGS. 9 and 10 may be analogous to PBs in ITU-T H.265. However, it should be noted that the CBs in FIGS. 9 and 10 are not limited to the PB shapes defined in ITU-T H.265 (i.e., the CBs may have shapes resulting from QTBT partitioning).

Referring to FIG. 9, for the luma channel, the CU associated with the intra prediction type is further partitioned according to a quad split and for the chroma channel, the CU associated with the intra prediction type is further partitioned according to a vertical split. Thus, according to the techniques described herein, luma and chroma channels may be independently partitioned according to a QTBT, where a CU associated with a intra prediction type forms the root of the independent QTBTs. Referring to FIG. 10, for the luma channel, the CU associated with the intra prediction type is further partitioned according to a quadtree split and for the chroma channel, the CU associated is not further split. Thus, according to the techniques described herein, one of the luma or chroma channels may be independently partitioned according to a QTBT, where a CU associated with a intra prediction type forms the root of the QTBT. It should be noted that in other examples, other types of partitioning may be allowed for the luma and/or chroma channels where a CU associated with a intra prediction type forms the root for further partitioning the luma and/or chroma channels. For example, any of the following combinations of the partitioning types may be enabled for each of the luma and/or chroma channels: no further partitioning, QT partitioning, BT partitioning, and QTBT partitioning.

In one example, types of partitioning that are enabled for each of the luma and/or chroma channels may be signaled using higher level syntax. For example, each of the luma and/or chroma channel partitioning types may be signaled at the CTU-level, the slice-level, or at a parameter-set level (e.g., a Picture Parameter set (PPS) or a Sequence Parameter Set (SPS)). As described above, QT split flag syntax elements and BT split mode syntax elements are associated with a depth, where a depth of zero corresponds to a root of a QTBT and higher value depths correspond to subsequent depths beyond the root. It should be noted that in some cases, depth may be defined with respect to a CU forming the root. In one example, whether and how the luma and/or chroma channels may be further partitioned beyond the CU associated with a intra prediction type may be based on maximum depth values. For example, further partitioning of the luma and/or chroma channels may be allowed only if it results in a depth that is less than or equal to a maximum depth. In one example, maximum depths for each of the luma and/or chroma channels may be signaled using higher level syntax. In one example, maximum depths may be provided for BT partitioning and/or QT partitioning. In one example, the maximum depths may be the same as the maximum depths specified for the QTBT partitioning rooted at the CTU-level. For example, for the luma channel, a maximum depth of 3 may be specified for QT partitioning and a maximum depth of 4 may be specified for BT partitioning.

In one example, whether and how the luma and/or chroma channels may be further partitioned beyond the CU associated with a intra prediction type may be based on the resulting shape and/or number of samples in a CB. For example, one or more of a minimum size (width×height), minimum height, and/or minimum width may be specified, such that a resulting CB must be greater than or equal to a specified minimum. In one example, minimum sizes/dimensions for each of the luma and/or chroma channels may be signaled using higher level syntax. In one example, the minimum sizes/dimensions/number of samples may be the same as the minimum sizes/dimensions/number of samples specified for the QTBT partitioning rooted at the CTU-level. Further, in one example, whether and how the luma and/or chroma channels may be further partitioned beyond the CU associated with a intra prediction type may be based on the shape and/or number of samples in the CTU and/or CU. For example, further partitioning of the luma and/or chroma channels may be enabled for CTUs and/or CUs having a size/dimension greater than or equal to minimum sizes/dimensions. Further, in one example, further partitioning of the luma and/or chroma channels may be enabled for CTUs and/or CUs having a size/dimension less than a minimum size/dimension. In one example, the minimum sizes/dimensions/number of samples may be the same as the minimum sizes/dimensions/number of samples specified for the QTBT partitioning rooted at the CTU-level. In one example, further partitioning of the luma and/or chroma channels may be enabled for CTUs and/or CUs having a size/dimension/number of samples less than or equal to a maximum size/dimension/number of samples. When the block size is smaller than the maximum, then partitioning (e.g., QT partitioning) may be inferred and no additional signaling is needed. In one example, the maximum sizes/dimensions/number of samples may be the same as the maximum sizes/dimensions/number of samples specified for the QTBT partitioning rooted at the CTU-level. In one example, each of the luma and/or chroma channels sizes/dimensions for CTUs and/or CUs may be signaled using higher level syntax. Further, in one example, each of the luma and/or chroma channel sizes/dimensions for CTUs and/or CUs may be predetermined.

Figure 11A:
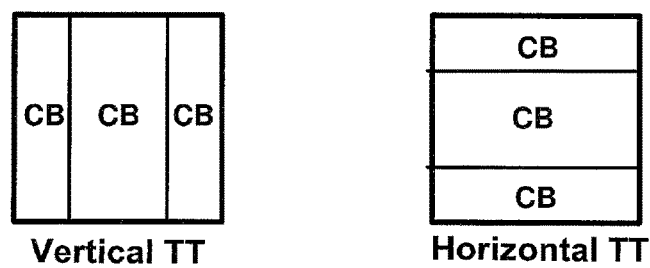
FIG. 11A is conceptual diagram illustrating partitioning in accordance with one or more techniques of this disclosure.

Li, et al., "Multi-Type-Tree," $4^{th}$ Meeting: Chengdu, Conn., 15-21 Oct. 2016, Doc. JVET-D0117r1 (hereinafter "Li"), describes an example where in addition to the symmetric vertical and horizontal BT split modes, two additional triple tree (TT) split modes are defined. Triple tree (TT) partitioning may refer to partitioning a node into three blocks about a direction. In Li, TT split modes for a node include: (1) horizontal TT partitioning at one quarter of the height from the top edge and the bottom edge of a node; and (2) vertical TT partitioning at one quarter of the width from the left edge and the right edge of a node. FIG. 11A illustrates examples of vertical TT partitioning and horizontal TT partitioning. It should be noted that as used herein, the term triple tree (TT) partitioning may refer to partitioning a node into three blocks about a direction for any offsets. That is, as used herein, TT partitioning is not limited to partitioning a node at one quarter offset (e.g., other offsets may include ⅓ offsets and/or asymmetric offsets, etc.). In one example, the partitioning types that may be enabled for partitioning each of the luma and/or chroma channels beyond the CU may include TT partitioning. Further, whether the luma and/or chroma channels beyond the CU may be partitioned according to a TT partitioning may be based on any of the techniques described above (e.g., maximum depth, minimum sizes/dimensions, number of sample values, etc.)

F. Le Léannec, et al., "Asymmetric Coding Units in QTBT," $4^{th}$ Meeting: Chengdu, Conn., 15-21 Oct.

Figure 11B:
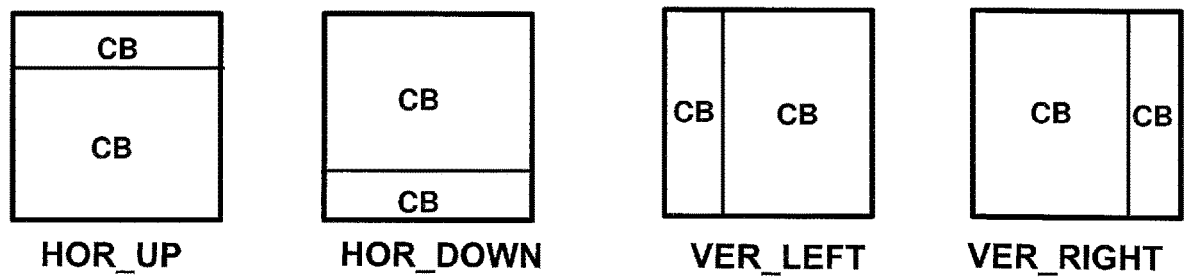
FIG. 11B is conceptual diagram illustrating partitioning in accordance with one or more techniques of this disclosure.

2016, Doc. JVET-D0064 (hereinafter "Le Léannec"), describes an example where in addition to the symmetric vertical and horizontal BT split modes, four additional asymmetric BT split modes are defined. In Le Léannec, the four additionally defined BT split modes for a CU include: horizontal partitioning at one quarter of the height (at the top for one mode or at the bottom for one mode) or vertical partitioning at one quarter of the width (at the left for one mode or the right for one mode). The four additionally defined BT split modes in Le Léannec are illustrated in FIG. 11B as Hor_Up, Hor_Down, Ver_Left, and Ver_Right. It should be noted that the four additionally defined BT split modes in Le Léannec may be referred to as asymmetric binary tree (ABT) partitions and are similar to the asymmetric PB partitions provided in ITU-T H.265. It should be noted that in some cases, the term ABT partitions may be used to refer to arbitrary binary tree partitions.

Figure 12:
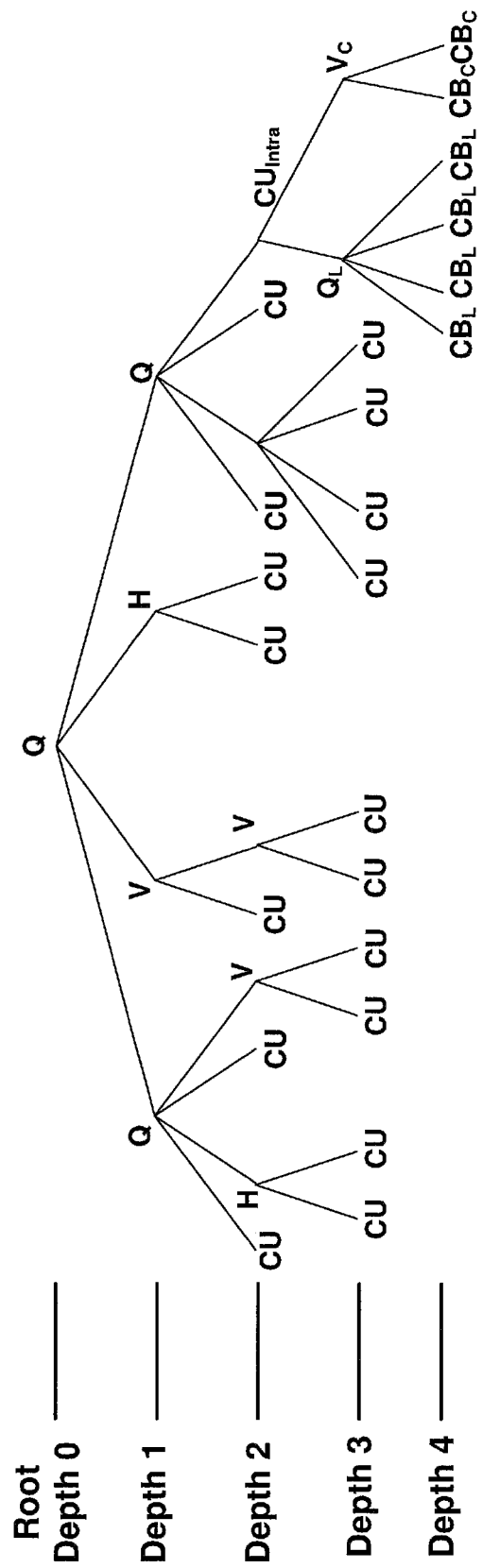
FIG. 12 is a conceptual diagram illustrating video component quad tree binary tree partitioning in accordance with one or more techniques of this disclosure.

As described above, in JEM, a QTBT is signaled by signaling QT split flag and BT split mode syntax elements. FIG. 12 is a conceptual diagram illustrating an example of a QTBT corresponding to the example QTBT partition illustrated in FIG. 9. As illustrated in FIG. 12, once a CU associated with an intra prediction type is reached, QTBTs are signaled for each of the luma component and chroma channels. Table 8 illustrates an example of pseudo-syntax that may be used to signal the shared QTBT and the independent QTBTs for the luma and chroma channels for the example illustrated FIG. 12. It should be noted that with respect to Table 8, for the purpose of illustration Pred Type Flag merely illustrates whether a prediction type is inter or intra. Typically, in an inter slice, a prediction type flag is preceded by a skip flag and the prediction type flag is only signaled when skip flag=0. The techniques described herein are generally applicable regardless of how a intra prediction type is indicated within a inter slice.

TABLE 8

QT flag = 1; //Depth 0 syntax
  QT flag = 1; //Depth 1 syntax
    QT flag = 0, BT split = 0; //Depth 2 syntax
      Pred Type = Inter // Pred Type Flag
    QT flag = 0, BT split = 2; //Depth 2 syntax
      BT split = 0; //Depth 3 syntax
        Pred Type = Inter // Pred Type Flag
      BT split = 0; //Depth 3 syntax
        Pred Type = Inter // Pred Type Flag
    QT flag = 0, BT split = 0; //Depth 2 syntax
      Pred Type = Inter // Pred Type Flag
    QT flag = 0, BT split = 1; //Depth 2 syntax
      BT split = 0; //Depth 3 syntax
        Pred Type = Inter // Pred Type Flag
      BT split = 0; //Depth 3 syntax
        Pred Type = Inter // Pred Type Flag
  QT flag = 0; BT split = 1; //Depth 1 syntax
    BT split - 0; //Depth 2 syntax
      Pred Type = Inter // Pred Type Flag
    BT split = 1; //Depth 2 syntax
      BT split = 0; //Depth 3 syntax
        Pred Type = Inter // Pred Type Flag
      BT split = 0; //Depth 3 syntax
        Pred Type = Inter // Pred Type Flag
  QT flag = 0; BT split = 2; //Depth 1 syntax
    BT split = 0; //Depth 2 syntax
      Pred Type = Inter // Pred Type Flag
    BT split = 0; //Depth 2 syntax
      Pred Type = Inter // Pred Type Flag
  QT flag = 1; //Depth 1 syntax
    QT flag = 0, BT split = 0; //Depth 2 syntax
      Pred Type = Inter // Pred Type Flag TABLE 8-continued QT flag = 1; //Depth 2 syntax
      QT flag = 0, BT split = 0; //Depth 3 syntax
        Pred Type = Inter // Pred Type Flag
      QT flag = 0, BT split = 0; //Depth 3 syntax
        Pred Type = Inter // Pred Type Flag
      QT flag = 0, BT split = 0; //Depth 3 syntax
        Pred Type = Inter // Pred Type Flag
      QT flag = 0, BT split = 0; //Depth 3 syntax
        Pred Type = Inter // Pred Type Flag
    QT flag = 0, BT split = 0; //Depth 2 syntax
      Pred Type = Inter // Pred Type Flag
    QT flag = 0, BT split = 0; //Depth 2 syntax
      Pred Type = Intra // Pred Type Flag
      QT Luma flag = 1;
        QT Luma flag = 0; BT Luma split = 0;
        QT Luma flag = 0; BT Luma split = 0;
        QT Luma flag = 0; BT Luma split = 0;
        QT Luma flag = 0; BT Luma split = 0;
      QT Chroma flag = 0, BT Chroma split = 1;
        BT Chroma split = 0;
        BT Chroma split = 0.

As illustrated in Table 8, upon reaching a coding unit (BT split=0), a prediction type for the coding unit is determined. If the prediction type is inter, no further partitioning signaling occurs for the coding unit. If the prediction type is intra, a QTBT is signaled for the luma channel and a QTBT is signaled for the chroma channel. Table 9A illustrates a general case of signaling that occurs for a coding unit. As described above, in some examples, further partitioning may be disabled for one of the luma channel or the chroma channel. In such examples, either of coding_tree_unit_luma( ) or coding_tree_unit_chroma( ) in Table 9A may be replaced with coding_block_luma( ) or coding_block_chroma( ).

TABLE 9A coding_unit( )
  pred_mode_flag
    if( pred_mode_flag == MODE_INTRA )
      coding_tree_unit_luma( )
      coding_tree_unit_chroma( )

Further, as described above, various techniques may be used to determine whether and how the luma and/or chroma channels may be further partitioned beyond the CU associated with a intra prediction type. Thus, in Table 9A, coding_tree_unit_luma( ) and coding_tree_unit_chroma( ) may provide semantics that enable various types of partitioning. For example, coding_tree_unit_chroma( ) may include semantics for applying BT or TT partitioning. In one example, the luma and chroma channels may be further partitioned beyond the CU associated with an intra prediction type according to separate partitioning trees or a shared partitioning tree. In one example, a flag may indicate whether the luma and chroma channels are further partitioned according to separate partitioning trees or a shared partitioning tree. Table 9B illustrates an example, where a flag (i.e., separate_tree_flag) indicates whether the luma and chroma channels are further partitioned according to separate partitioning trees (i.e., coding_tree_unit_luma( ) and coding_tree_unit_chroma( )) or a shared partitioning tree (i.e., coding_tree_unit_shared( ), where coding_tree_unit_shared( ) provides semantics that enables various types of partitioning.

TABLE 9B

```
coding_unit( )
    pred_mode_flag
        if( pred_mode_flag == MODE_INTRA )
            separate_tree_flag
            if(separate_tree_flag == TRUE )
                coding_tree_unit_luma( )
                coding_tree_unit_chroma( )
            else
                coding_tree_unit_shared( )
```

In one example, whether the luma and chroma channels are further partitioned according to separate partitioning trees or a shared partitioning tree may be inferred based on properties of video data and/or coding parameters. For example, referring to Table 9B, the separate_tree_flag==TRUE condition may be replaced with a condition based on properties of video data and/or coding parameters. In one example, whether separate partition trees or a shared partitioning tree is used for further partitioning the luma and chroma channels may be conditioned on the number of samples (e.g., luma or chroma samples) included in the CU. In one example, when the number of samples included in the CU is less than or equal to a threshold (e.g., 64, 256, or 1024 samples), separate partition trees may be used for further partitioning the luma and chroma channels, otherwise a shared partition tree is used. In one example, when the number of samples included in the CU is greater than or equal to a threshold, separate partition trees may be used for further partitioning the luma and chroma channels, otherwise a shared partition tree is used.

As described above, for an intra prediction slice, only intra prediction modes are enabled and for an inter prediction slice both intra prediction modes and inter prediction modes are enabled. It should be noted that inter prediction slices may further be classified as being either a P type slice (or P slice) or a B type slice (B slice), where for a B slice uni-directional and bi-predictive inter prediction is enabled and for an P slice only uni-directional inter prediction is enabled. In one example, whether separate partition trees or a shared partitioning tree is used for further partitioning the luma and chroma channels may be conditioned on whether an inter prediction slice including the intra CU is a P slice or a B slice. It should be noted in one example, whether a flag is present and used to indicate whether the luma and chroma channels are further partitioned according to separate partitioning trees or a shared partitioning tree may be conditioned on a slice type. For example, in one example, separate_tree_flag in Table 9B may be present for P slices and not present for B slices or alternatively, separate_tree_flag in Table 9B may be present for B slices and not present for P slices. As described above, intra CUs may be included in intra slices and inter slices. In one example, intra CUs included in intra slices may be further partitioned where a flag may indicate whether the luma and chroma channels are further partitioned according to separate partitioning trees or a shared partitioning tree. Thus, in one example, separate_tree_flag in Table 9B may be present for intra and inter slices. In one example, separate_tree_flag in Table 9B may present for any subset of slice types. In one example, whether a flag is present and used to indicate whether the luma and chroma channels are further partitioned according to separate partitioning trees or a shared partitioning tree may be conditioned on properties of video data and/or coding parameters. For example, separate_tree_flag in Table 9B may present based on the size of an intra CU and/or the depth at which the intra CU occurs.

It should be noted that although separate_tree_flag in Table 9B is described as being signalled at the CU-level, in other examples, separate_tree_flag may be signaled at the CTU-level, the slice-level, a tile-level, a wavefront-level, or at a parameter-set level (e.g., a PPS or a SPS). Further, in one example, whether further partitioning of the luma and chroma channels according to separate partitioning trees or a shared partitioning tree is enabled (e.g., whether separate_tree_flag may be present based on video data and/or coding parameters) may be determined according to a higher level flag. For example, a flag included in a slice header, may indicate whether separate_tree_flag may be present at a CU-level and the actual presence of separate_tree_flag at a particular CU may be based on the size of the CU.

As described above, whether and how the luma and/or chroma channels may be further partitioned beyond the CU associated with a intra prediction type may be based on maximum depth values, where maximum depths for each of the luma and chroma channels may be signaled using higher level syntax. In one example, maximum depths for each of luma and chroma channels partitioned according to a shared partitioning tree may be signaled independently, in which case, each channel would be partitioned according to the shared tree up to its maximum depth. In one example, maximum depths for each of the luma and chroma channels partitioned according to separate partitioning trees may be signaled independently. For example, a flag included in a slice header may indicate whether separate_tree_flag may be present at a CU-level and the actual presence of separate_tree_flag at a particular CU may be based on the size of the CU and the slice header may further indicate a respective maximum depths for each of the luma and chroma channels.

As described above, the presence of separate_tree_flag in Table 9B may be based on the depth at which the intra CU occurs. In one example, the depth at which the intra CU occurs may be specified with respect to a root occurring (i.e., depth 0) at a CTU and may be referred to as cu_depth. As illustrated in the example of FIG. 9 and FIG. 12, the depth of the intra CU is 2. In one example, separate_tree_flag may not be present in a bitstream for an intra CU in instances where cu_depth is greater than or equal to a depth value (e.g., max_depth). In one example, when separate_tree_flag is not present in a bitstream it may be inferred to have a value of 1 (or 0, in some examples) and as such, separate partitioning trees (e.g., coding_tree_unit_luma( ) and coding_tree_unit_chroma( )) may be used to partition the luma and chroma channels beyond the intra CU. In one example, when separate_tree_flag is not present in a bitstream it may be inferred to have a value of 0 (or 1, in some examples) and as such, a shared partitioning tree (e.g., coding_tree_unit_shared( )) may be used to partition the luma and chroma channels beyond the intra CU.

Table 9C illustrates an example where separate_tree_flag is conditionally present in a bitstream based on an intra CUs having a cu_depth greater than or equal to a depth and when separate_tree_flag is not present in a bitstream, separate partitioning trees are used to partition the luma and chroma channels beyond the intra CU. Table 9D illustrates an example where separate_tree_flag is conditionally present in a bitstream based on an intra CUs having a cu_depth greater than or equal to a depth and when separate_tree_flag is not present in a bitstream, a shared partitioning tree is used to partition the luma and chroma channels beyond the intra CU. In one example, max_depth in Table 9C and 9D may be signaled using higher level syntax. For example, max_depth may be signaled at the CTU-level, the slice-level, or at a parameter-set level. In one example, max_depth in Table 9C and 9D may be equal to MaxBTDepth.

TABLE 9C

```
coding_unit( )
    ...
    pred_mode_flag
    if( pred_mode_flag == MODE_INTRA ) {
        if(cu_depth >= max_depth)
            coding_tree_unit_luma( )
            coding_tree_unit_chroma( )
        else
            separate_tree_flag
            if(separate_tree_flag == TRUE )
                coding_tree_unit_luma( )
                coding_tree_unit_chroma( )
            else
                coding_tree_unit_shared( )
    }
```

TABLE 9D

```
coding_unit( )
    pred_mode_flag
    if( pred_mode_flag == MODE_INTRA ) {
        if(cu_depth >= max_depth)
            coding_tree_unit_shared( )
        else
            separate_tree_flag
            if(separate_tree flag = TRUE )
                coding_tree_unit_luma( )
                coding_tree_unit_chroma( )
            else
                coding_tree_unit_shared( )
    }
```

It should be noted that in some examples, the condition (cu_depth>=max_depth) in Tables 9C-9D may be replaced with (cu_depth==max_depth). Further, in some examples, the condition (cu_depth>=max_depth) in Tables 9C-9D may be replaced with the following condition (cu_depth>=max_depth OR cu_width==min_width OR cu_height==min_height), where cu_width is the width of the CU in number of samples, cu_height is the height of the CU in number of samples, min_width is a width threshold in number of samples, and min_height is a height threshold in number of samples. In this manner, in one example, the presence of separate_tree_flag in the bitstream may be further conditioned on the number of samples (e.g., luma or chroma samples) included in the intra CU. Further, it should be noted that in some examples, values for max_depth, min_width, and/or min_height may be based on a slice type (e.g., P or B) and/or a color component index values. In one example, (cu_depth>=max_depth) in each of the examples illustrated in Table 9C and Table 9D may be replaced with the condition (cu_depth<=max_depth), such that the signaling of separate_tree_flag would be skipped, based on an intra CUs having a cu_depth less than or equal to a depth. It should be noted that in this case, max_depth is a depth value that represents a threshold depth (i.e., for an intra CU having a depth less than or equal to max_depth, in this case, the value of separate_tree_flag is inferred). In one example, (cu_depth>=max_depth) in each of the examples illustrated in Table 9C and Table 9D may be replaced with the condition (cu_height<=min_height OR cu_width<=min_width), such that the signaling of separate_tree_flag would be skipped, based on an intra CUs being less than or equal to a size. It should be noted that in this case, min_height and min_width represent threshold values. In one example, (cu_depth>=max_depth) in each of the examples illustrated in Table 9C and Table 9D may be replaced with the condition (cu_height>=min_height OR cu_width>=min_width), such that the signaling of separate_tree_flag would be skipped, based on an intra CU being greater than or equal to a minimum size. In this manner, a video decoder may infer the value of separate_tree_flag based on a block size. It should be noted that, in some examples, the values of max_depth, min_width, and/or min_height may be dependent on the slice type (e.g., P or B slice) for the slice including the CU and/or a channel (e.g., luma or chroma).

As described above, in JEM, a QTBT leaf node for a color component (i.e., a CB in JEM) may be considered analogous to a PB and a TB in ITU-T H.265. As such, in JEM once a QTBT leaf node is reached, additional signaling is provided to indicate a prediction corresponding to the QTBT leaf node (e.g., an intra prediction direction) and transform characteristics corresponding to the residual corresponding to the QTBT leaf node (e.g., a NSST_idx). For example, referring to FIG. 9, for each of the four luma CBs, according to JEM signaling, respective predictions and transform characteristics corresponding to the residual would be included in a bitstream. In one example, according to the techniques described herein, signaling of predictions and transform characteristics of a CB may be based on whether the presence and/or value of separate_tree_flag. For example, in the example corresponding to Table 9C, in one example, the number of possible values of NSST_idx allowed for the chroma channel may be based on whether separate partitioning trees are used to partition the luma and chroma channels beyond the intra CU. In one example, if separate partitioning trees are used to partition the luma and chroma channels beyond the intra CU, the number of possible values of NSST_idx allowed for the chroma channel may be equal to 4. In the example corresponding to Table 9D, in one example, the number of possible values of NSST_idx allowed for the chroma channel may be based on whether a shared partitioning trees is used to partition the luma and chroma channels beyond the intra CU. In one example, if a shared partitioning tree is used to partition the luma and chroma channels beyond the intra CU, the number of the number of possible values of NSST_idx allowed for the chroma channel may be equal to 3.

As described above, in JEM once a QTBT leaf node is reached, additional signaling is provided to indicate a prediction corresponding to the QTBT leaf node and transform characteristics corresponding to the residual corresponding to the QTBT leaf node. Thus, in JEM, for each QTBT leaf node, respective signaling is provided to indicate a prediction corresponding to the QTBT leaf node and transform characteristics corresponding to the residual corresponding to the QTBT leaf node. In one example, according to the techniques described herein, CBs beyond the intra CU (e.g., each of the four luma CBs in FIG. 9) may share one or more aspects of prediction information and/or transform characteristics. In this manner, according to the techniques described herein, signaling of prediction and/or transform characteristics for respective leaf nodes may be simplified. In one example, according to the techniques described herein respective predictions and transform characteristics for each CB beyond the intra CU (e.g., each of the four luma CBs in FIG. 9), may be inferred based on the presence and/or value of separate_tree_flag. For example, referring to the example illustrated in FIG. 9, in one example each of the four luma CBs may share inferred (or signaled) prediction information (e.g., a directional intra prediction mode) and/or transform characteristics (e.g., an NSST_idx value) based on the presence and/or value of separate_tree_flag.

Referring again to the examples illustrated in Tables 9B-9D, in example, partitioning the luma and chroma channels beyond the intra CU using a shared partitioning tree may not be allowed, may be disabled based on higher level signaling (e.g., a CTU or slice level enable/disable flag), may be disabled based on properties of the CU (e.g., size, and/or depth), and/or may be disabled based on higher level signaling and/or properties of the CU. Table 9E illustrates an example where partitioning the luma and chroma channels beyond the intra CU using a shared partitioning tree is not allowed. That is, in the example of Table 9E, if the luma and chroma channels are not further partitioned according to separate partitioning trees, further partitioning terminates. That is, as illustrated in Table 9E, prediction and transform characteristic syntax is signaled for the intra CU without further partitioning of the luma and chroma channels. Table 9F illustrates an example where partitioning the luma and chroma channels beyond the intra CU using a shared partitioning tree is disabled based on higher level signaling and/or properties of the CU. That is, in Table 9F, the condition (CU Condition==TRUE) may be a condition based on higher level signaling and/or properties of the CU. It should be noted that in some examples, the condition (CU Condition==TRUE) may be a based on a property of a bitstream (i.e., determined without additional signaling). For example, (CU Condition==TRUE) may be a flag that is present based on a higher level (e.g., CTU level, slice level, parameter set level) enable/disable flag.

TABLE 9E

```
...
    separate_tree_flag
    if(separate_tree_flag == TRUE )
        coding_tree_unit_luma( )
        coding_tree_unit_chroma( )
    else
        //prediction and transform characteristic syntax for intra CU
...
```

TABLE 9F

```
...
    separate_tree_flag
    if(separate_tree_flag == TRUE )
        coding_tree_unit_luma( )
        coding_tree_unit_chroma( )
    else
        if(CU Condition == TRUE)
            coding_tree_unit_shared( )
        else
            //prediction and transform characteristic syntax for intra CU
...
```

It should be noted that with respect to the example illustrated in Table 9E, not allowing partitioning of the luma and chroma channels beyond the intra CU using a shared partitioning tree may reduce the complexity of implementing a compliant video encoder and a compliant video decoder. However, in some cases, not allowing partitioning of the luma and chroma channels beyond the intra CU using a shared partitioning tree may result in a loss of coding efficiency.

As described above, whether separate partition trees or a shared partitioning tree is used for further partitioning the luma and chroma channels, where a CU associated with a intra prediction type forms the root for further partitioning the luma and/or chroma channels, may be conditioned on the number of samples (e.g., luma or chroma samples) included in the CU. In one example, a range of block sizes may be allowed to be partitioned according to a shared tree and a range of block sizes may be allowed to be partitioned according to separate trees. Table 9G illustrates an example where separate_tree_flag is conditionally present in a bitstream based on the following conditions (1) whether the size of the CU is greater than or equal to an upper size threshold (cu_width*cu_height>=Upper_TH); (2) whether the size of the CU is less than or equal to a lower size threshold (cu_width*cu_height<=lower_TH); and (3) whether further partitioning is allowed (no further partitioning allowed). It should be noted that the condition (no further partitioning allowed) in Table 9G may be similar to the (CU Condition==TRUE) condition described above. In one example, Upper_TH and/or Lower_TH may be signalled using high level signalling. For example, Upper_TH may be set to 1024 samples and Lower_TH may be set to 256 samples. In one example, the determination of whether no further partitioning is allowed may be based on the example conditions provided above, e.g., (cu_depth>=max_depth), (cu_depth>=max_depth OR cu_width==min_width OR cu_height==min_height), etc. In one example, the condition for determining whether no further partitioning is allowed may be signalled using high level signalling.

TABLE 9G

```
coding_unit( )
    ...
    pred_mode_flag
    if( pred_mode_flag == MODE_INTRA ) {
        If (cu_width*cu_height >= Upper_TH)
            coding_tree_unit_luma( )
            coding_tree_unit_chroma( )
        else if (cu_width*cu_height <= Lower_TH)
            coding_tree_unit_shared( )
        else if (no further partitioning allowed)
            coding_tree_unit_luma( )
            coding_tree_unit_chroma( )
        else
            separate_tree_flag
            if(separate_tree_flag == TRUE )
                coding_tree_unit_luma( )
                coding_tree_unit_chroma( )
            else
                coding_tree_unit_shared( )
    }
```

Table 9H illustrates an example where separate_tree_flag is conditionally present in a bitstream based on the following conditions (1) whether the size of the CU is greater than or equal to an upper size threshold (cu_width*cu_height>=Upper_TH); and (2) whether the size of the CU is less than or equal to a lower size threshold (cu_width*cu_height<=lower_TH).

TABLE 9H

```
coding_unit( )
    ...
    pred_mode_flag
    if( pred_mode_flag == MODE_INTRA ) {
        If (cu_width*cu_height >= Upper_TH)
            coding_tree_unit_luma( )
            coding_tree_unit_chroma( )
        else if (cu_width*cu_height <= Lower_TH)
            coding_tree_unit_shared( )
```

TABLE 9H-continued

```
        else
            separate_tree_flag
            if(separate_tree_flag == TRUE )
                coding_tree_unit_luma( )
                coding_tree_unit_chroma( )
            else
                coding_tree_unit_shared( )
}
```

In one example, whether separate partition trees or a shared partitioning tree is used for further partitioning the luma and chroma channels, where a CU associated with a intra prediction type forms the root for further partitioning the luma and/or chroma channels, may be conditioned on the value of a QP associated the CU. For example, in one example, separate_tree_flag may be conditionally present in a bitstream based on the following conditions (1) whether the value of a QP is greater than or equal to an upper threshold; (2) whether the value of a QP is less than or equal to a lower threshold; and/or (3) whether further partitioning is allowed. That is, for example, the conditions (cu_width*cu_height>=Upper_TH) and (cu_width*cu_height<=lower_TH) in Tables 9G and 9H may be respectively replaced with the conditions (QP>=Upper_QP_TH) and (QP<=Lower_QP_TH), where, in one example, Upper_QP_TH and/or Lower_QP_TH may be signalled using high level signalling. For example, Upper_QP_TH may be set to 40 and Lower_QP_TH may be set to 10. In one example, the minimum allowed leaf size for each of coding_tree_unit_luma( ), coding_tree_unit_chroma( ) and/or coding_tree_unit_shared( ) may be distinct. For example, coding_tree_unit_shared( ) may have a minimum allowed leaf size of 16 samples (e.g., 4×4) and coding_tree_unit_luma( ) and/or coding_tree_unit_chroma( ) may have a minimum allowed leaf size of 256 (e.g., 16×16).

As described above, inter prediction slices may further be classified as being either a P type slice or a B type slice and whether separate partition trees or a shared partitioning tree is used for further partitioning the luma and chroma channels may be conditioned on whether an inter prediction slice including the intra CU is a P slice or a B slice. Further, it should be noted that in ITU-T H.265, to support temporal scalability each inter slice may be associated with a temporal identifier (i.e., TemporalId variable), that indicates a level in a hierarchical temporal prediction structure. For example, slices in pictures forming a 30 Hz base layer may have TemporalId=0 and slices in pictures forming a 60 Hz scalable sub-layer may have TemporalId=1. It should be noted that pictures with a lower temporal identifier, i.e., pictures corresponding to a lower layer of video, are more frequently relied upon as predictors. For example, pictures included in a 30 Hz base layer would generally be more frequently relied upon as predictors than pictures included in a 60 Hz scalable sub-layer. The quality of pictures that are more frequently relied upon as predictors generally have a higher impact of video quality than the quality of pictures that are less frequently relied upon as predictors. Further, due to the hierarchical temporal prediction structure of temporal scalable video, when pictures at lower layers are low quality, errors may propagate to multiple higher layers of video (i.e., temporal error propagation). In contrast, when pictures at higher layers are low quality, temporal error propagation may be limited. As used herein, the term prediction depth of a picture may be used to refer to a value that quantifies how many pictures at various hierarchical layers rely (directly or indirectly) on the picture as a predictor. Prediction depth may be used to determine an expected temporal error propagation based on the quality of a picture. In one example, a prediction depth may correspond to TemporalId or may be function of TemporalId. In one example, a prediction depth may be equal to TemporalId plus one. In one example, according to the techniques described herein, whether separate partition trees are used, a shared partitioning tree is used, and/or whether further partitioning is allowed for an intra CU included in an inter prediction slice may be based on the prediction depth of the inter prediction slice. For example, in one example, whether further partitioning of an intra CU included in an inter prediction slice may be disabled if a prediction depth is greater than or equal to a threshold.

As described above, for example, with respect to Tables 9C and 9D, an example where separate_tree_flag may be conditionally present in a bitstream based on an intra CUs having a cu_depth greater than or equal to a variable max_depth. In one example, the variable max_depth may be equal to or a function of prediction depth. Thus, in a manner similar to that described above, the signaling of syntax elements used for further partitioning an intra CU included in an inter prediction slice may be skipped based on a prediction depth and a video decoder may be configured to infer the values of syntax elements that are not included in the bitstream. In one example, for pictures having a prediction depth greater than a threshold, further partitioning of luma and chroma channels beyond the CU level may be disabled, e.g., partitioning as described in JEM may be used. In this manner, more precise partitioning techniques may be allowed for pictures having relatively a high prediction reliance compared to pictures having a relatively low prediction reliance, where less precise partitioning techniques utilize fewer bits in a bitstream. As described above, whether and how the luma and/or chroma channels may be further partitioned beyond the CU associated with a intra prediction type may be based on higher level signaling and/or properties of video blocks. For example, partitioning the luma and chroma channels beyond the intra CU using a shared partitioning tree may not be allowed, may be disabled based on higher level signaling (e.g., a CTU or slice level enable/disable flag), may be disabled based on properties of the CU (e.g., size, and/or depth), and/or may be disabled based on higher level signaling and/or properties of the CU. In a similar manner, whether and how the luma and/or chroma channels may be further partitioned beyond the CU associated with a intra prediction type may be based on higher level signaling and/or a prediction depth. For example partitioning the luma and chroma channels beyond the intra CU using a shared partitioning tree may not be allowed, may be disabled based on higher level signaling (e.g., a CTU or slice level enable/disable flag), may be disabled based on properties of prediction depth (e.g., size, and/or depth), and/or may be disabled based on higher level signaling and/or prediction depth.

As described above, in one example, max_depth in Table 9C and 9D may be signaled using higher level syntax, e.g., the CTU-level, the slice-level, or at a parameter-set level. In a similar manner, when the variable max_depth is equal to or a function of prediction depth, a prediction depth threshold at which separate partition trees are used, a shared partitioning tree is used, and/or whether further partitioning is allowed for an intra CU included in an inter prediction slice may be signaled using higher level syntax. In one example, a syntax element highest_tid_sst_plus1 based on the following example definition:

highest_tid_sst_plus1 specifies that pictures with TemporalId greater than highest_tid_sst_plus1 do not use shared separate tree. When not present highest_tid_sst_plus1 is inferred to be equal to 7.

may be included in a parameter set (e.g., VPS, SPS, or PPS) or a slice header. Further, in one example, highest_tid_sst_plus1 may be may be signaled conditionally based on the value of a flag that indicates if a shared separate tree tool is used for coding video data.

In one example, different semantics may be used when highest_tid_sst_plus1 has a value of 0. That is, default cases may be defined for highest_tid_sst_plus1 having a value of 0. In one example, a value of 0 for highest_tid_sst_plus1 may be used to indicate information about a relation between TemporalId value and use of shared separate tree is unknown. In one example, a value of 0 for highest_tid_sst_plus1 may indicate that shared separate tree is used only for certain picture types. In one example, a syntax element highest_tid_sst_plus1 may be based on the following example definition:

highest_tid_sst_plus1 specifies that pictures with TemporalId less than or equal to highest_tid_sst_plus1 may or may not use shared separate tree. When not present highest_tid_sst_plus1 is inferred to be equal to 7.

Thus, in one example, in the examples described above, the condition if(pred_mode_flag==MODE_INTRA) may be replaced with if(highest_id_sst_plus1 && pred_mode_flag==MODE_INTRA). In one example, the general decoding process for coding units coded using an intra prediction mode, which may be described as follows:

Inputs to this process are:
  a luma location (xCb, yCb) specifying the top-left sample of the current luma coding block relative to the top-left luma sample of the current picture,
  a variable log 2CbSize specifying the size of the current luma coding block.
  TemporalId of the current picture Output of this process is a modified reconstructed picture before deblocking filtering.

May be subject to a condition based on TemporalId. That is, for example, the following clause may be included in the general decoding process for coding units coded using an intra prediction mode:

When the TemporalId of the current picture is less than or equal to highest_tid_sst_plus1 an alternative derivation process for the intra prediction mode with the luma location (xCb, yCb) as input is invoked.

As described above, coding_tree_unit_shared( ) provides semantics that enables various types of partitioning and similar to coding_tree_unit_luma( ) or coding_tree_unit_chroma( ) may provide semantics that enables various types of partitioning (e.g., BT or TT partitioning). In some examples, coding_tree_unit_shared( ) may be constrained to further partition the luma and chroma channels only a predetermined depth beyond the CU. In one example, coding_tree_unit_shared( ) may be constrained to further partition the luma and chroma channels only one depth beyond the CU. For example, in this case, coding_tree_unit_shared( ) may include a single syntax element indicating one of: no split, a QT split, a horizontal BT split, a vertical BT split, a horizontal TT split, and/or a vertical TT split. In one example, coding_tree_unit_shared( ) may include a single syntax element indicating one of: a horizontal BT split, a vertical BT split. In one example, when coding_tree_unit_shared( ) includes a single syntax element possible splits may include any combination of: no split, a QT split, a horizontal BT split, a vertical BT split, a horizontal TT split, and/or a vertical TT split.

Figure 13:
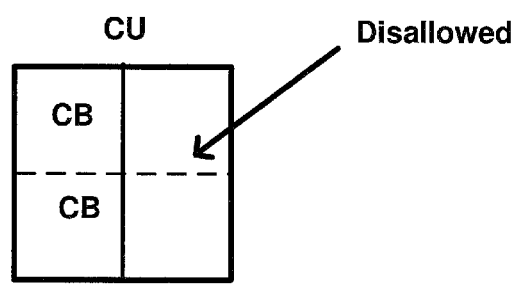
FIG. 13 is a conceptual diagram illustrating video component partitioning in accordance with one or more techniques of this disclosure.

It should be noted that some ways of signaling a particular partition structure may be considered inefficient and/or redundant. For example, in some cases, BT and TT splits can result in square blocks that can be achieved by simply using QT splitting (e.g., a vertical BT split and subsequent horizontal BT splits for each node results in four squares). Video encoder 200 may be configured to disallow redundant and/or inefficient signaling. JEM provides where a BT split that results in an equivalent QT split is disallowed at a video encoder. FIG. 13 is a conceptual diagram illustrating an example of a disallowed BT split. That is, in FIG. 13 a subsequent horizontal BT split of the right node (the node resulting from a vertical BT split of the CU) would result in four squares and is disallowed. In some examples, when splits are disallowed, inference may be used to determine if other types of splits are applied. For example, referring to FIG. 13, since a horizontal BT split is disallowed for the right node, one of a vertical BT split or no further splitting may be inferred for the node. As described, above in some examples, whether further partitioning is enabled may be based on maximum depths and the like. Thus, in some cases, certain types of partitioning may be disallowed at a particular depth level. Thus, whether splitting or no further splitting is allowed for a particular node may be inferred based on the depth of the node and/or whether a particular split is inefficient and/or redundant.

In one example, according to the techniques herein, when further partitioning luma and/or chroma channels where a CU associated with a intra prediction type forms a root node, one or more of the following techniques may be used to mitigate inefficient and/or redundant signaling. In one example, for the chroma channel, when a BT split results in an equivalent QT split, the split may be disallowed and signaling may be modified based on the split being disallowed. For example, referring to FIG. 13, for the left node resulting from the vertical split, the following types of splits may be allowed: no splitting, a vertical BT split, and a horizontal BT. As such, syntax would enable signaling of one of the three types of splits for the node (e.g., the signaling may include a split/no split flag and a conditionally present vertical/horizontal flag). In the case of the right node, since the horizontal BT is disallowed, the syntax need only enable signaling of two types of BT splits (no split or vertical BT split). Thus, the signaling may be modified such that for the right node, the split/no split flag indicates whether no split or a vertical BT split occurs. Further, in cases where one or more non-BT split choices are allowed for the right node (e.g., QT or TT), the syntax may enable one or more non-BT split choices to be signaled. For example, if the split/no split flag indicates no split for the right node, additional syntax elements may be present indicating whether one or more non-BT splits is applied. Likewise, if only one non-BT split is available for the right node, and if the split/no split flag indicates no split for the right node, the one non-BT split may be inferred. Similarly, in one example, for the luma channel, when a BT split results in an equivalent QT split, the split may be disallowed and syntax may be modified based on the split being disallowed as described above. Further, in one example, one or more of the following constraints may be applied: types of BT splits may be disallowed, if it results in a TT, TT splits may be disallowed, if it results in a combination of QT split and a BT split, and in general, a split may be disallowed, if it results in a combination of a subset of splits. In one example, video encoder 200 may select whether or not to disable various splits and signal whether splits are enabled and thus, a video decoder may determine the inference rules based on whether various splits are enabled or disabled.

In one example, video encoder 200 may be configured such that one or more of the following apply: when no further splits are allowed for a node, skip signaling partitioning and infer no-split; when no further QT splits are allowed for a node, skip signaling QT split and signal only if non-QT/no splits are allowed. In general, in one example, video encoder 200 may be configured such that, when no further splits of a particular type are allowed, then video encoder 200 may skip signaling splits of a particular type and signal only splits types that are available.

Figure 14A:
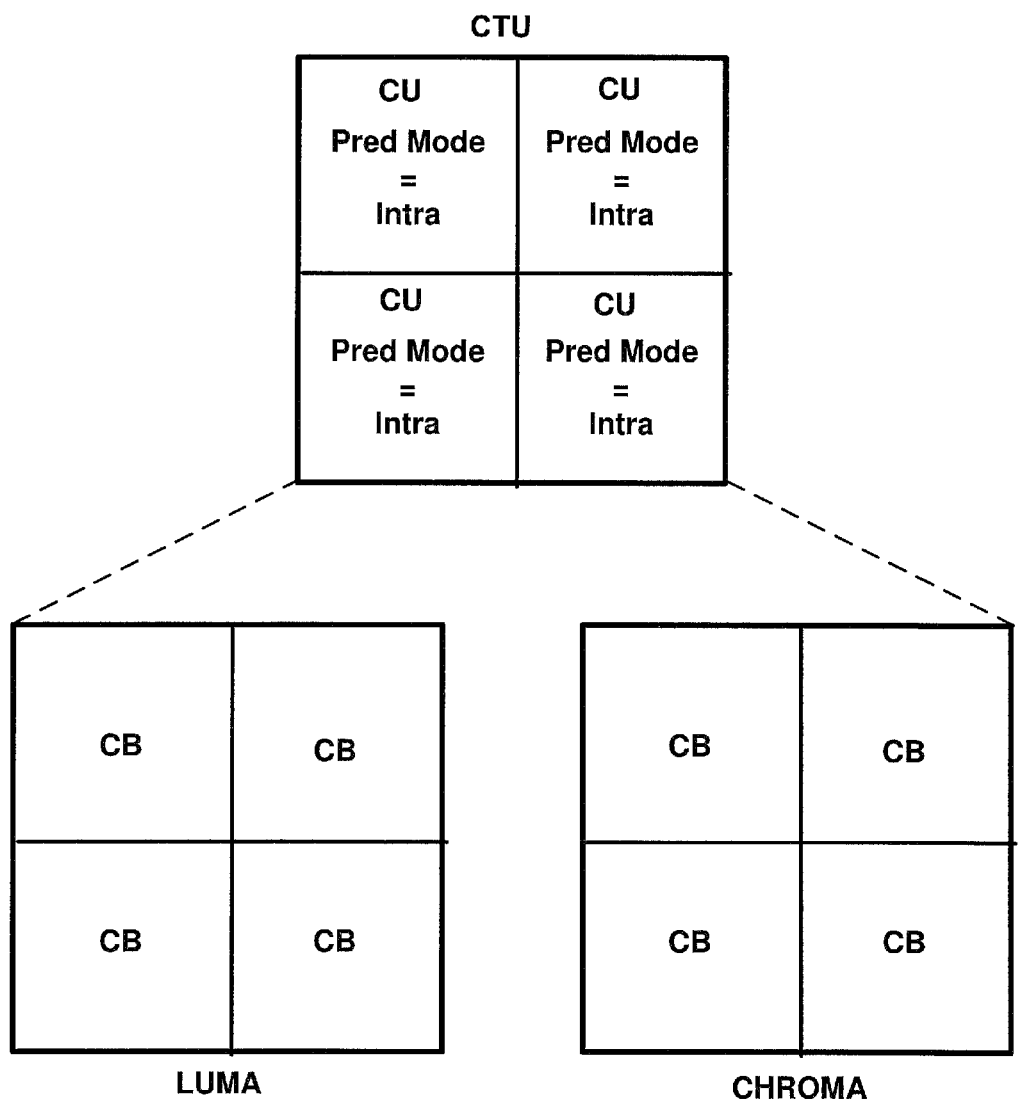
FIG. 14A is a conceptual diagram illustrating video component quad tree binary tree partitioning in accordance with one or more techniques of this disclosure.
Figure 14B:
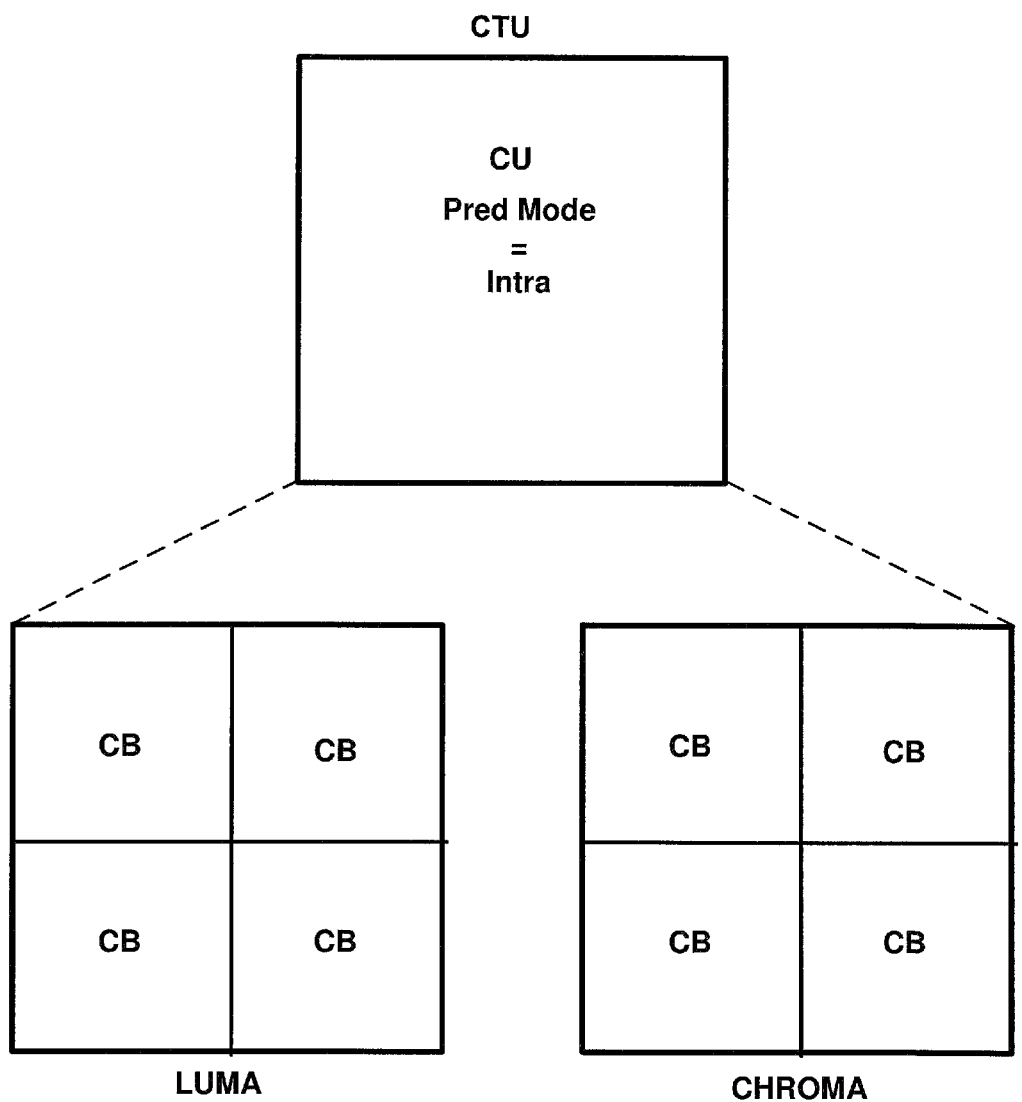
FIG. 14B is a conceptual diagram illustrating video component quad tree binary tree partitioning in accordance with one or more techniques of this disclosure.
Figure 15A:
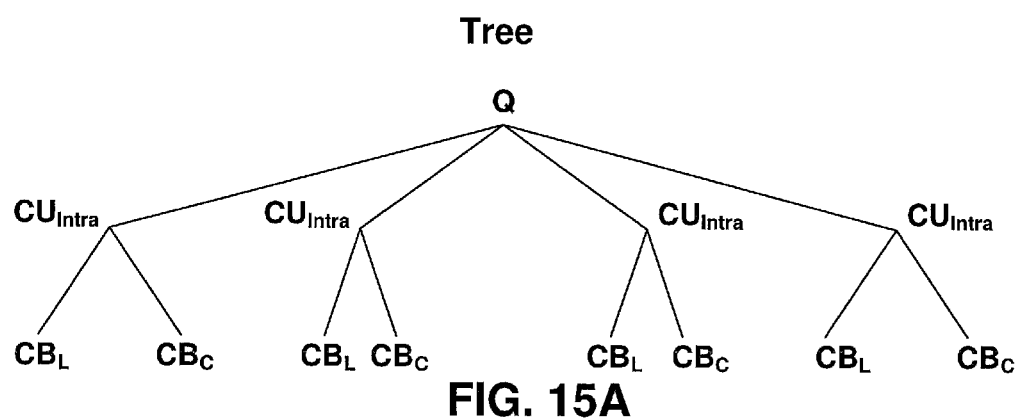
FIG. 15A is a conceptual diagram illustrating video component quad tree binary tree partitioning in accordance with one or more techniques of this disclosure.
Figure 15B:
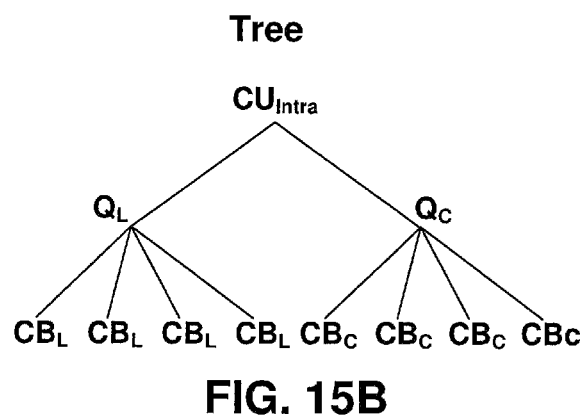
FIG. 15B is a conceptual diagram illustrating video component quad tree binary tree partitioning in accordance with one or more techniques of this disclosure.

It should be noted that when further partitioning of luma and/or chroma channels is enabled for a CU associated with a intra prediction type, there may be multiple QTBTs that result in equivalent CBs. FIGS. 14A-14B are conceptual diagrams illustrated equivalent resulting CBs for both the luma channel and the chroma channel using different QTBTs. FIG. 15A-15B illustrate the respective QTBTs for the resulting CBs in FIGS. 14A-14B. Further, Tables 10A-10B illustrates respective example pseudo-syntax that may be used to signal the respective QTBTs for the resulting CBs in FIGS. 14A-14B.

TABLE 10A

QT flag = 1;
  QT flag = 0, BT split = 0;
    Pred Type = Intra // Pred Type Flag
      QT Luma flag = 0; BT Luma split = 0;
      QT Chroma flag = 0; BT Chroma split = 0;
  QT flag = 0, BT split = 0;
    Pred Type = Intra // Pred Type Flag
      QT Luma flag = 0; BT Luma split = 0;
      QT Chroma flag = 0; BT Chroma split = 0;
  QT flag = 0, BT split = 0;
    Pred Type = Intra // Pred Type Flag
      QT Luma flag = 0; BT Luma split = 0;
      QT Chroma flag = 0; BT Chroma split = 0;
  QT flag = 0, BT split = 0;
    Pred Type = Intra // Pred Type Flag
      QT Luma flag = 0; BT Luma split = 0;
      QT Chroma flag = 0; BT Chroma split = 0.

TABLE 10B

QT flag = 0, BT split = 0;
  Pred Type = Intra // Pred Type Flag
    QT Luma flag = 1;
      QT Luma flag = 0; BT Luma split = 0;
      QT Luma flag = 0; BT Luma split = 0;
      QT Luma flag = 0; BT Luma split = 0;
      QT Luma flag = 0; BT Luma split = 0;
    QT Chroma flag = 1;
      QT Chroma flag = 0; BT Chroma split = 0;
      QT Chroma flag = 0; BT Chroma split = 0;
      QT Chroma flag = 0; BT Chroma split = 0;
      QT Chroma flag = 0; BT Chroma split = 0.

Referring to Tables 10A-10B, the signaling used in Table 10A may be considered less efficient than the signaling in Table 10B, (i.e., Table 10A requires more bits to signal an equivalent resulting partition). Thus, in one example, video encoder 200 may be configured such the signaling in Table 10A is disallowed. In one example, video encoder 200 may be configured to perform an iterative partitioning process, such that video encoder 200 evaluates whether a resulting partition can be more efficiently represented using another partitioning. Further, it should be noted that using the signaling in Table 10B may provide additional efficiency gains making residual and metadata available at early points in a bitstream sequence.

As described above, for example with respect to FIG. 13, according to the techniques described herein, a BT node may be further partitioned according to non-BT partitioned (e.g., QT or TT splits). It should be noted that in JEM, a BT node may not be further partitioned according QT partitions. That is, as described above with respect to Table 1, in JEM, when a QT split flag has a value of 0, a BT split mode syntax element is signaled, indicating one of: no binary split, a vertical split mode, or a horizontal split mode.

Further, as described above, Le Léannec describes an example where in addition to the symmetric vertical and horizontal BT split modes, four additional ABT split modes are defined. In Le Léannec, a BT or ABT node may not be further partitioned according QT partitions. That is, in Le Léannec, when a QT split flag has a value of 0, a BT split mode flag is signaled, indicating one of: a vertical split orientation or a horizontal split orientation, and a first added flag signals if current the BT split mode is asymmetric or not. If the BT split mode is not asymmetric (according to the first added flag), the BT split mode is derived as horizontal or vertical, according to the signaled BT split orientation. If the BT split mode is asymmetric (according to the first added flag), a second added flag indicates the type of asymmetric split mode used, for the considered BT split orientation (i.e., up or down for horizontal or left or right for vertical). Further, as described above, Li describes an example where in addition to the symmetric vertical and horizontal BT split modes, two additional TT split modes are defined. In Li, a BT or TT node may not be further partitioned according QT partitions. That is, in Li, when a QT split flag has a value of 0, a split flag is signaled, indicating one of: split or no split. If a split is indicated, a first flag is signaled indicating a horizontal or vertical orientation, and a second flag is signaled indicating a BT split or a TT split.

As described above, according to the techniques described herein, various types of partitioning may be allowed for the luma and/or chroma channels where a CU associated with a intra prediction type forms the root for further partitioning the luma and/or chroma channels. In one example, according to the techniques described herein, further partitioning of a CU associated with a intra prediction type may be constrained such that a BT and/or ABT node may not be further partitioned according to a QT partition. In one example, according to the techniques described herein, further partitioning of a CU associated with a intra prediction type may allow a BT and/or ABT node to be further partitioned according to a QT partition. In one example, according to the techniques described herein, further partitioning of a CU associated with a intra prediction type may be constrained such that a BT and/or TT node may not be further partitioned according a QT partition. In one example, according to the techniques described herein, further partitioning of a CU associated with a intra prediction type may allow a BT and/or TT node to be further partitioned according QT partitions. In the examples where BT, ABT, and TT nodes are allowed to be further partitioned according to QT partition, at each BT, ABT, and TT node a QT split flag may be signaled indicating whether a QT partition is applied. In the examples where BT, ABT, and TT nodes are not allowed to be further partitioned according to QT partition, at each BT, ABT, and TT having a BT, ABT, or TT node as an ancestor, node a QT split flag is not signaled. In one example, according to the techniques described herein, further partitioning of a CU associated with a intra prediction type may include a combination of BT, ABT, and TT partitioning. Tables 10C-10D illustrate examples of bin coding signaling used for signaling QT partitioning, BT partitioning, TT partitioning, and ABT partitioning according to the techniques described herein. As described above, in the examples where BT, ABT, and TT nodes may be further partitioned according to QT partition, at each BT, ABT, and TT node a QT split flag may be signaled indicating whether a QT partition is applied. Referring to Table 10C, when QT is not allowed after a BT, ABT, and TT, node Bin0 is not transmitted for nodes that have a BT, ABT, or TT node as an ancestor in the partition tree. With respect to Tables 10C-10D, it should be noted that there may be cases when some partitions are either equivalent to others or some partitioning is not possible in which case the binarization may be modified for coding efficiency.

TABLE 10C

| | | Bin Coding Tree | | | | |
|---|---|---|---|---|---|---|
| $Bin_0$ | $Bin_1$ | $Bin_2$ | $Bin_3$ | $Bin_4$ | $Bin_5$ | Partition Type |
| 1 | N/A | N/A | N/A | N/A | N/A | Quad Tree Split |
| 0 | 0 | N/A | N/A | N/A | N/A | Leaf Node |
| 0 | 1 | 0 | 0 | N/A | N/A | Horizontal TT |
| 0 | 1 | 0 | 1 | 0 | N/A | Horizontal Symmetric Binary Tree |
| 0 | 1 | 0 | 1 | 1 | 0 | Horizontal ¼ of block dimension top (Hor_Top) |
| 0 | 1 | 0 | 1 | 1 | 1 | Horizontal ¼ of block dimension bottom (Hor_Bottom) |
| 0 | 1 | 1 | 0 | N/A | N/A | Vertical TT |
| 0 | 1 | 1 | 1 | 0 | N/A | Vertical Symmetric Binary Tree |
| 0 | 1 | 1 | 1 | 1 | 0 | Vertical ¼ of block dimension left (Ver Left) |
| 0 | 1 | 1 | 1 | 1 | 1 | Vertical ¼ of block dimension right (Ver_Right) |

TABLE 10D

| | | Bin Coding Tree | | | | |
|---|---|---|---|---|---|---|
| $Bin_0$ | $Bin_1$ | $Bin_2$ | $Bin_3$ | $Bin_4$ | $Bin_5$ | Partition Type |
| 1 | N/A | N/A | N/A | N/A | N/A | Quad Tree Split |
| 0 | 0 | N/A | N/A | N/A | N/A | Leaf Node |
| 0 | 1 | 0 | 0 | N/A | N/A | Horizontal Symmetric Binary Tree |
| 0 | 1 | 0 | 1 | 0 | N/A | Horizontal TT |
| 0 | 1 | 0 | 1 | 1 | 0 | Horizontal ¼ of block dimension top (Hor_Top) |
| 0 | 1 | 0 | 1 | 1 | 1 | Horizontal ¼ of block dimension bottom (Hor_Bottom) |
| 0 | 1 | 1 | 0 | N/A | N/A | Vertical Symmetric Binary Tree |
| 0 | 1 | 1 | 1 | 0 | N/A | Vertical TT |
| 0 | 1 | 1 | 1 | 1 | 0 | Vertical ¼ of block dimension left (Ver Left) |
| 0 | 1 | 1 | 1 | 1 | 1 | Vertical ¼ of block dimension right (Ver_Right) |

As described above, the presence of syntax element (e.g., separate_tree_flag) in the bitstream and whether and how an intra CU may be further partitioned may be conditioned on the depth of a block in a partitioning structure and block sizes. It should be noted that in one example, the depth of an ABT leaf may correspond to number of samples in included in the leaf. In one example, when further partitioning includes ABT partitioning, the value of separate_tree_flag may be inferred based on block size, and/or the depth of BT, TT, and/or ABT leaf nodes.

In this manner, video encoder 200 represents an example of a device configured to receive a video block including sample values for a first component of video data and a second component of video data, partition the sample values for the first component of video data and the second component of video data according to a first quad tree binary tree partitioning structure, and for samples values of the first component of video data included in nodes of the first quad tree binary tree associated with an intra prediction type, further partition the samples according to a second quad tree binary tree.

Referring again to FIG. 8, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

As described above, in JEM, for intra prediction, a core transform and a subsequent secondary transform may be applied to a residual aligned with a QTBT leaf node to generate transform coefficients based on a prediction mode. In the case where one or both of the luma and chroma channels may be further partitioned for prediction purposes according to the techniques described herein, the AMT and MDNSST techniques described in JEM may be less than ideal. In one example, according to the techniques described herein, AMT may be enabled (capable of being applied or not applied) or disabled (not capable of being applied) for the luma and chroma channels according to the techniques described herein. In one example, for the luma channel residual corresponding to and aligned with a luma CB, (where the luma CB is included in an intra prediction mode CU included in an inter prediction slice), AMT may be enabled and for the chroma channel residual corresponding to and aligned with a chroma CB, AMT may be disabled. That is, referring to the example illustrated in FIG. 9, for the CU indicated as having prediction type intra, AMT may be selective applied for the luma channel CB residual and disabled for the chroma channel CB residual. In one example, AMT may be disabled if the width or the height of the CB is greater than a threshold. In one example, the threshold may be 64. In one example, AMT is enabled only if there is one CB with at least one or more core transform coefficient level values not being equal to 0. In one example, whether AMT may be enabled or disabled for the luma CB channel and/or the chroma CB channel in a CU indicated as having prediction type intra included in an inter slice may be signaled using higher level syntax. It should be noted that in some examples, residuals provided as input to a core transform may correspond to and be aligned with the intra prediction CU.

As described above, in JEM, NSST_idx, includes four possible values (i.e., 0=MDNSST not applied; and 1-3 correspond to a transform matrix) is signaled once per intra CU. In one example, according to the techniques described herein, possible values of NSST_idx may be defined according to Table 11. In one example, TH1 and TH2 in Table 11 may be equal to 8.

TABLE 11

|  | Luma Channel | Chroma Channel |
| --- | --- | --- |
| CU Width [in luma samples] >= TH1 && CU Height [in luma samples] >= TH2 | NSST_idx range 0 to 3 | NSST_idx range 0 to 3 |
| Other Sizes of CUs | NSST_idx range 0 to 3 | NSST_idx range 0 |

Thus, according to the techniques described herein, for the chroma channel core transform coefficients, MDNSST may be enabled if the corresponding CU has a width and/or height greater than a threshold. Further, in one example, the MDNSST may be applied only in cases where the number of core transform coefficient level values greater than zero is greater than a threshold. Further, in one example, the MDNSST may not be applied if a CU does not include any core transform level values not equal to 0. In one example, the MDNSST may be applied only in cases where the transform-quantization bypass is not applied. In one example, NSST_idx may range from 0 to 2 for DC and planar prediction modes. In one example, the range of NSST_idx may be controlled using higher level syntax.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 8, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 8, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode.

As described above, JEM specifies techniques for modifying reference samples prior to generating residual data and modifying references samples prior to reconstructing a video block (e.g., PDPC and ARSS). In the case where one or both of the luma and chroma channels may be further partitioned for prediction purposes according to the techniques described herein, techniques for modifying reference samples in JEM may be less than ideal. In one example, according to the techniques described herein, for a luma channel CB include in an intra prediction mode CU included in an inter prediction slice, PDPC may be enabled and for the chroma channel CB included, PDPC may be disabled. That is, referring to the example illustrated in FIG. 9, for each of the four luma channel CBs, PDPC may be selective applied and for the two chroma channel CBs, PDPC may be disabled. In one example, when MDNSST is applied for a CU, PDPC may be disabled for CBs included in the CU. In one example, whether PDPC may be is enabled or disabled for the luma and/or chroma channel CBs may be signaled using higher level syntax.

In one example, according to the techniques described herein, for a luma channel CB included in an intra prediction mode CU included in an inter prediction slice, ARSS may be enabled and for the chroma channel CB, ARSS may be disabled. That is, referring to the example illustrated in FIG. 9, for each of the four luma channel CBs, ARSS may be selective applied and for the two chroma channel CBs, ARSS may be disabled. In one example, ARSS is not be applied, if the width or height of a CB is greater than a threshold. In one example, ARSS is not be applied, if the prediction mode of a CB is DC. In one example, whether ARSS may be enabled or disabled for the luma and/or chroma channel CBs in a CU may be signaled using higher level syntax.

As described above, in JEM for the MDNSST, there are 35 non-separable transform matrices, where 11 is the number of transform sets for the directional intra prediction mode and each transform set includes 3 transform matrices and for non-directional modes, (i.e., Planar, DC and LM) only one transform set is applied which includes 2 transform matrices. As further described above, chroma channels may be further partitioned according to separate partitioning trees. In one example, the LM mode may be allowed for the chroma channel, when the chroma channels are further partitioned according to separate partitioning tree for any subset of slice types (e.g., B type only or intra and inter type slices). Further, in one example, for the chroma channels using the DC or Planar prediction modes a corresponding transform set may include 3 transform matrices.

Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218.

As illustrated in FIG. 8, inter prediction processing unit 214 may receive reconstructed video block via filter unit 216. Filter unit 216 may be configured to perform deblocking, Sample Adaptive Offset (SAO), and/or ALF filtering. As described above, deblocking refers to the process of smoothing the boundaries of reconstructed video blocks (e.g., make boundaries less perceptible to a viewer). As described above, SAO filtering is a non-linear amplitude mapping that may be used to improve reconstruction by adding an offset to reconstructed video data. As described above, JEM defines an ALF.

As described above, ITU-T H.265 includes two types deblocking filters that may be used for modifying luma samples: a Strong Filter and a Weak Filter and one type of filter that may be used for modifying chroma samples: Normal Filter. In ITU-T H.265, a boundary strength measure is used to determine whether a type of filter is applied. In one example, according to the techniques described herein, filter unit 216 may be configured to determine a boundary strength based on whether one or more of the following is applied during the coding of video data: PDPC, ARSS, AMT, and/or MDNSST.

Further, as described above, JEM provides where for the luma component a picture-level flag may enable an ALF to be selectively applied to each CU in a picture and where for the chroma component the ALF is enabled or disabled at the picture level. In the case where one or both of the luma and chroma channels may be further partitioned for prediction purposes according to the techniques described herein, techniques in JEM for applying the ALF and signaling whether the ALF is applied may be less than ideal. In one example, filter unit 216 may be configured to apply the ALF and signal whether the ALF is applied according to the techniques described herein.

In one example, the presence of a flag indicating whether the ALF is applied for a block (e.g., a CU or CB) is based on the depth of the block, where depth may be related to a CTU root or a CU root. This flag may be referred to as ALF ON/OFF. In one example, ALF ON/OFF and corresponding ALF signaling is not present if the depth of a block is greater than a threshold. In some examples, the threshold may be signaled in a bitstreams. In one example, the value of ALF ON/OFF may be inferred for intra blocks (e.g., a CU or CB). In one example, the value of ALF ON/OFF for intra blocks may be independent for the luma channel and the chroma channel. In one example, signaling used for ALF ON/OFF may be signaled at the root of intra-mode tree in inter slices. In one example, signaling used for ALF ON/OFF may be signaled at the root of intra-mode tree in inter slices, only if the depth the root of intra-mode tree is less than or equal to the depth allowed for signaling ALF ON/OFF. In one example, signaling used for ALF ON/OFF may be signaled at depths of intra-mode tree in inter slices, only if the depth the root of intra-mode tree is less than or equal to the depth allowed for signaling ALF ON/OFF In one example, ALF ON/OFF signaling for intra blocks may be based on a signaled partition depth independent of inter coded blocks, where ALF ON/OFF and corresponding ALF signaling is not present if the depth of a block is greater than a threshold. In one example, ALF may be applied to intra coded luma and chroma blocks selectively, where the selection may be signaled. In one example, separate sets of ALF coefficients may be signaled for intra-coded blocks, independent of inter-coded blocks. In one example, separate sets of ALF coefficients may be signaled for luma and chroma channels.

In one example, ALF chroma sample classifications may be derived using luma sample classification for intra blocks in inter slices. In one example, ALF CU-level ON/OFF for chroma may be derived using an ON/OFF state of one or more co-located luma CB's for intra blocks in inter slices e.g., chroma CU-level flag is ON only if at least one of the co-located luma CB is ON.

Referring again to FIG. 8, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

As described above, in the example of a CABAC, for a particular bin, a context model may be selected from a set of available context models associated with the bin. In some examples, a context model may be selected based on a previous bin and/or values of previous syntax elements. In particular, for a syntax element a CABAC context variable is indexed using a context table and a content index (ctxidx). As further described above, according to the techniques described herein, for inter slices, if the prediction type of a CU is intra, a QTBT is signaled for the luma channel and a QTBT is signaled for the chroma channel.

In one example, the context of a split information (e.g., whether a QT, BT, or TT split is applied) for a channel may be determined as follows:
Set CtxtIdx to 0;
If Left block's split depth is greater than current split depth, CtxtIdx++;
If Top block's split depth is greater than current split depth, CtxtIdx++;
Use CtxtIdx to code split.

In one example, context selection for a channel may depend on whether an adjacent block was coded using an intra prediction. For example, a content may be determined as follows:
Set CtxtIdx to 0;
If Left block's split depth is greater than current split depth and prediction mode is not intra, CtxtIdx++;
If Top block's split depth is greater than current split depth and prediction mode is not intra, CtxtIdx++;
Use CtxtIdx to code split.

In one example, context selection may depend on whether an adjacent block was coded using an intra prediction and if separate or shared tree partitioning was used.

In one example, the context of a split information may be based on the depth of the intra mode CU. It should be noted that in one example, depths are determined separately for luma and chroma channels when a CU in an inter slice has an intra type.

In one example, the context of a split information for a channel may be determined as follows:
Set CtxtIdx to 0;
If Left block's size is less than current size, CtxtIdx++;
If Top block's size is less than current size, CtxtIdx++;
Use CtxtIdx to code split.

In one example, context selection for a channel may depend on whether an adjacent block was coded using an intra prediction. For example, a content may be determined as follows:
Set CtxtIdx to 0;
If Left block's size is less than current size and prediction mode is not intra, CtxtIdx++;
If Top block's size is less than current size and prediction mode is not intra, CtxtIdx++;
Use CtxtIdx to code split.

In one example, the context of a split information may be based on the size of the intra mode CU. In one example, size may correspond to number of samples in a block.

In one example, a context may be determined as follows:
Set CtxtIdx to 0;
If Left block's split depth is greater than current split depth and prediction mode is not intra, CtxtIdx++;
If Top block's split depth is greater than current split depth and prediction mode is not intra, CtxtIdx++;
Determine Max depth amongst adjacent blocks, when adjacent blocks are intra-coded and make use of separate trees are considered unavailable for the purposes of determining max depth;
Determine Min depth amongst adjacent blocks, when adjacent blocks are intra-coded and make use of separate trees are considered unavailable for the purposes of determining max depth;
If current depth at which split syntax element is being signaled is smaller than Min depth for adjacent blocks, then set CtxIdx to 3;
If current depth at which split syntax element is being signaled is larger than or equal to Max depth for adjacent blocks plus 1 then set CtxIdx to 4;
Use CtxtIdx to code split.

In one example, a context may be determined as follows:
Set CtxtIdx to 0;
If Left block's split depth is greater than current split depth and prediction mode is not intra, CtxtIdx++;
If Top block's split depth is greater than current split depth and prediction mode is not intra, CtxtIdx++;
Determine Max depth amongst adjacent blocks, where adjacent blocks are available for the purposes of determining Max depth only if shared/separate tree flag of current and adjacent blocks are the same;
Determine Min depth amongst adjacent blocks, where adjacent blocks are available for the purposes of determining Min depth only if shared/separate tree flag of current and adjacent blocks are the same;
If current depth at which split syntax element is being signaled is smaller than Min depth for adjacent blocks, then set CtxIdx to 3;
If current depth at which split syntax element is being signaled is larger than or equal to Max depth for adjacent blocks plus 1 then set CtxIdx to 4;
Use CtxtIdx to code split.

In one example, split syntax elements may be signaled per channel and the adjacent blocks may correspond to depth of channel under consideration.

As described above, in some examples, a flag (e.g., separate_tree_flag) may indicate whether the luma and chroma channels are further partitioned according to separate partitioning trees or a shared partitioning tree. In one example, a single a CABAC context variable may be used for entropy coding the flag and the context may be updated based on the values of the flag. In one example, a set of CABAC contexts variables may be available for entropy coding the flag. In one example, the context variable selected from the set may be based on the value(s) of the flag in a neighboring (spatial or temporal) blocks. In one example, the context selection for coding of the flag may be based on the depth of current block.

In one example, a context for the flag may be determined as follows:
Set CtxtIdx to 0;
If Left block's flag is TRUE, CtxtIdx++;
If Top block's flag is TRUE, CtxtIdx++;
Use CtxtIdx to code flag.

As described above, in one example, further partitioning may include ABT partitioning and the depth of an ABT leaf (i.e., a ¼ leaf and a ¾ leaf) may correspond to the number of samples included in the leaf.

In one example, a context for a flag indicating an ABT split mode (e.g., the second added flag indicating the type of asymmetric split mode used, described above) may be determined as follows:

Set CtxtIdx to 0;

If Left block's ABT depth is greater than current ABT depth, CtxtIdx++;

If Top block's ABT depth is greater than current ABT depth, CtxtIdx++;

Use CtxtIdx to code ABT flag.

In one example, when further partitioning includes ABT partitioning, context selection for a channel may depend on whether an adjacent block was coded using an intra prediction. For example, a context may be determined as follows:

Set CtxtIdx to 0;

If Left block's ABT depth is greater than current ABT depth and prediction mode is not intra, CtxtIdx++;

If Top block's ABT depth is greater than current ABT depth and prediction mode is not intra, CtxtIdx++;

Use CtxtIdx to code ABT flag.

In one example, when coding ABT split information using context selection based on adjacent block, the context is based on the depth at which intra-mode was selected.

As described above, the partitioning techniques described herein may result in rectangular coding blocks, in contrast to partitioning techniques in ITU-T H.265 that result in square coding blocks having equal height and width dimensions which are a power of 2. That is, for example, in ITU-T H.265, a 64×64 CU can be recursively partitioned into 32×32, 16×16, and 8×8 CUs. The size of square coding blocks having equal height and width dimensions which are a power of 2 can be expressed as $2^N$. Further, computation of the average of sample values located at the boundary of a square coding block having equal height and width dimensions which are a power of 2 can be implemented using a simple bit-shift operation. That is, the average of sample values located at the boundary of an $2^N \times 2^N$ video block can be computed by shifting the sum of the sample values by N+1 (i.e., SUM(Sample Values)>>(N+1)). Some coding tools, for example, those included in ITU-T H.265, that utilize the computation of an average value for samples located at the boundary a coding block assume coding blocks are square having equal height and width dimensions which are a power of 2 and thus, use a bit-shift operation to implement an averaging function. Such average computations need to be modified in order to compute the average of sample values located at the boundary of an arbitrary shape rectangular block (e.g., a block having dimensions W×H) while maintaining the ability to use a simple bit-shift operation to implement a division by the number of values included in the average. Additionally, coding tools such as those described in H. Liu, "Local Illumination Compensation," ITU-Telecommunications Standardization Sector, Study Group 16 Question 6, Video Coding Experts Group (VCEG), 52nd Meeting, 19-26 Jun. 2015, Warsaw, Poland, Document: VCEG-AZ06 and Zhang et al., "Enhanced Cross-component linear model chroma intra prediction," $4^{th}$ Meeting: Chengdu, Conn., 15-21 Oct. 2016, Document: JVET-D0110 require the derivation of parameters of a linear model. The derivation of such parameters includes computing the sums of values and of squares of values of samples located at the boundary of a coding block, and computing divisions by the number of samples included in such sums. Such divisions can be implemented using bit-shift operations when the number of samples is a power of 2, as is the case for square blocks having equal height and width dimensions which are a power of 2. Such sum computations need to be modified in order to compute the sums of sample values and of squared sample values located at the boundary of an arbitrary shape rectangular block while maintaining the ability to use a simple bit-shift operation to implement a division by the number of values included in a sum.

In one example, according to the techniques herein, variables log 2NumSamplesH and log 2NumSamplesV may be derived such that 2 to the power log 2NumSamplesH is less than or equal to the width, W, of the current block, ($2^{log\ 2NumSamplesH}$<=W) and 2 to the power log 2NumSamplesV is less than or equal to the height, H, of the current block $2^{log\ 2NumSamplesV}$<=H). A variable log 2NumSamples may then be derived as follows:

If only samples from a horizontally adjacent block are available, log 2NumSamples is set equal to log 2NumSamplesV;

If only samples from a vertically adjacent block are available, log 2NumSamples is set equal to log 2NumSamplesH;

Otherwise, i.e., samples from both a vertically adjacent block and a horizontally adjacent block are available, log 2NumSamples is set equal to the minimum of log 2NumSamplesH and log 2NumSamplesV.

Once log 2NumSamples is set, a value numSamples may be defined as 2 to the power log 2NumSamples. The value numSamples may be used to determine the number of samples from an adjacent block used to compute an average or a sum. It should be noted that numSamples may be less than either or both W and H. As such, according to the techniques herein, determining which numSamples samples of an adjacent block are used in an average or sum computation may be determined as follows:

If samples from a horizontally adjacent block are available, numSamples samples from such block are used for computing an average or a sum. The vertical position of the i-th sample is given by (i*H+H/2)>>log 2NumSamples for i=0 . . . numSamples−1. It should be noted that this formulation guarantees the samples are more or less equally distributed across the height of the block.

If samples from a vertically adjacent block are available, numSamples samples from such block are used for computing an average or a sum. The horizontal position of the i-th sample is given by (i*W+W/2)>>log 2NumSamples for i=0 . . . numSamples−1. It should be noted that this formulation guarantees the samples are more or less equally distributed across the width of the block.

Figure 16:
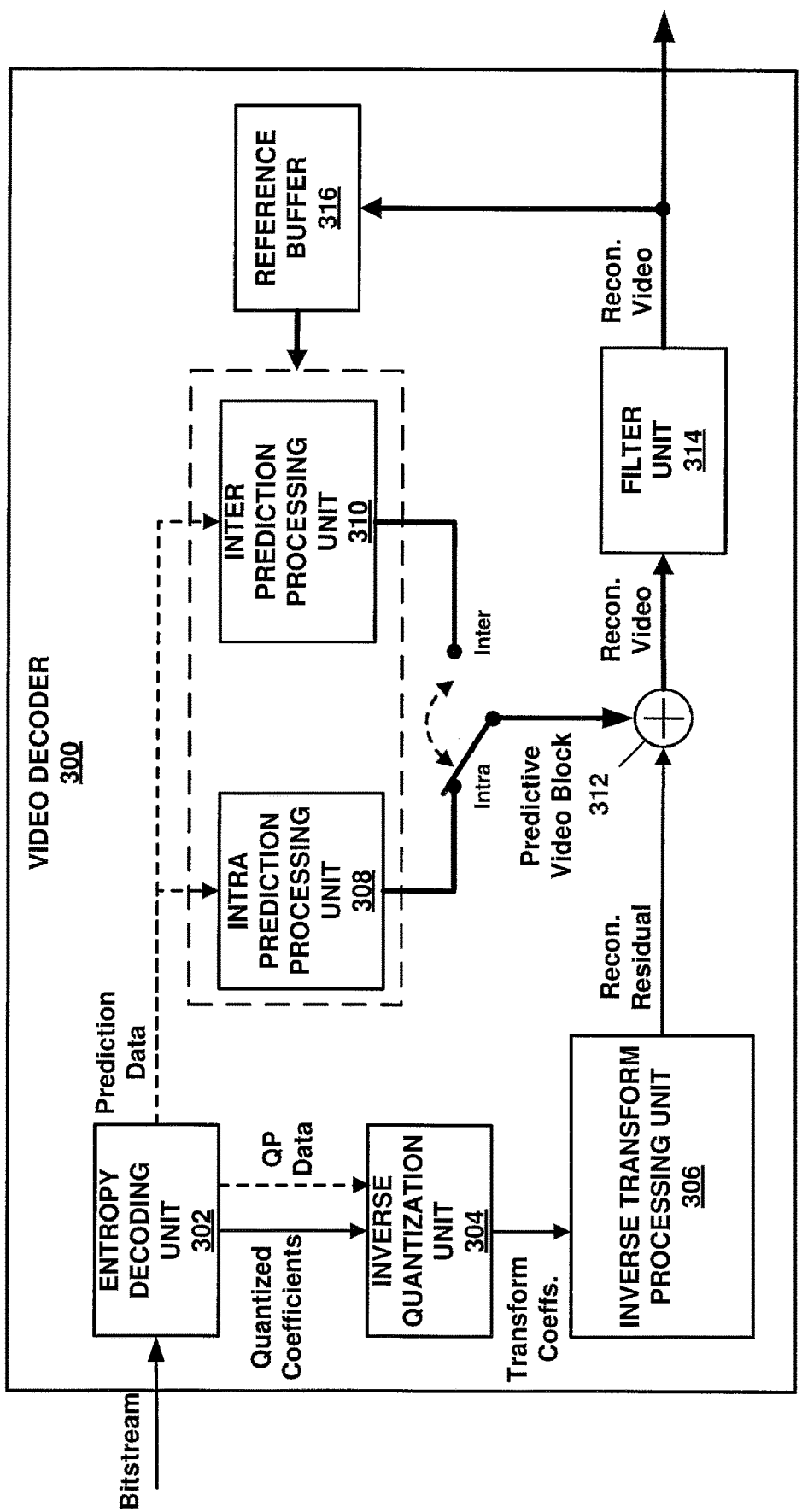
FIG. 16 is a block diagram illustrating an example of a video decoder that may be configured to decode video data according to one or more techniques of this disclosure.

FIG. 16 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 16 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 16, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. That is, for example, video decoder 300 may be configured to determine QTBT partitioning structures generated and/or signaled based on one or more of the techniques described above for purposes of reconstructing video data. For example, video decoder 300 may be configured to parse syntax elements and/or evaluate properties of video data in order to determine a QTBT.

Referring again to FIG. 16, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values (e.g., determine a sum of QT depth and BT depth based on coding parameters), allowed quantization group sizes, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, MDNSST, or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 16, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction). In one example, video decoder 300 and the filter unit 314 may be configured to determine QP values and use them for filtering (e.g., deblocking). In one example, other functional blocks of the video decoder 300 which make use of QP may determine QP based on received signaling and use that for decoding.

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Filter unit 314 may be configured to perform filtering on reconstructed video data. For example, filter unit 314 may be configured to perform deblocking, SAO filtering, and/or ALF, as described above with respect to filter unit 216. Further, it should be noted that in some examples, filter unit 314 may be configured to perform proprietary discretionary filter (e.g., visual enhancements). As illustrated in FIG. 16, a reconstructed video block may be output by video decoder 300. In this manner, video decoder 300 may be configured to generate reconstructed video data according to one or more of the techniques described herein. In this manner video decoder 300 may be configured to parse a first quad tree binary tree partitioning structure, apply the first quad tree binary tree partitioning structure to a first component of video data, apply the first quad tree binary tree partitioning structure to a second component of video data, determine whether a node of the first quad tree binary tree is associated with an intra prediction type, upon determining that the node of the first quad tree binary tree is associated with an intra prediction type, parse a second first quad tree binary tree partitioning structure, and apply the second quad tree binary tree partitioning structure to samples values of the first component of video data included in nodes of the first quad tree binary tree.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Overview>

In one example, a method of partitioning video data for video coding, comprises receiving a video block including sample values for a first component of video data and a second component of video data, partitioning the sample values for the first component of video data and the second component of video data according to a first quad tree binary tree partitioning structure, and for samples values of the first component of video data included in nodes of the first quad tree binary tree associated with an intra prediction type, further partitioning the samples according to a second quad tree binary tree.

In one example, a device for partitioning video data for video coding comprises one or more processors configured to receive a video block including sample values for a first component of video data and a second component of video data, partition the sample values for the first component of video data and the second component of video data according to a first quad tree binary tree partitioning structure, and for samples values of the first component of video data included in nodes of the first quad tree binary tree associated with an intra prediction type, further partition the samples according to a second quad tree binary tree.

In one example, a non-transitory computer-readable storage medium comprises instructions stored thereon that, when executed, cause one or more processors of a device to receive a video block including sample values for a first component of video data and a second component of video data, partition the sample values for the first component of video data and the second component of video data according to a first quad tree binary tree partitioning structure, and for samples values of the first component of video data included in nodes of the first quad tree binary tree associated with an intra prediction type, further partition the samples according to a second quad tree binary tree.

In one example, an apparatus comprises means for receiving a video block including sample values for a first component of video data and a second component of video data, means for partitioning the sample values for the first component of video data and the second component of video data according to a first quad tree binary tree partitioning structure, and means for further partitioning the samples according to a second quad tree binary tree for samples values of the first component of video data included in nodes of the first quad tree binary tree associated with an intra prediction type.

In one example, a method of determining partitioning of video data comprises parsing a first quad tree binary tree partitioning structure, applying the first quad tree binary tree partitioning structure to a first component of video data, applying the first quad tree binary tree partitioning structure to a second component of video data, determining whether a node of the first quad tree binary tree is associated with an intra prediction type, upon determining that the node of the first quad tree binary tree is associated with an intra prediction type, parsing a second first quad tree binary tree partitioning structure, and applying the second quad tree binary tree partitioning structure to samples values of the first component of video data included in nodes of the first quad tree binary tree.

In one example, a device for determining partitioning of video data comprises one or more processors configured to parse a first quad tree binary tree partitioning structure, apply the first quad tree binary tree partitioning structure to a first component of video data, apply the first quad tree binary tree partitioning structure to a second component of video data, determine whether a node of the first quad tree binary tree is associated with an intra prediction type, upon determining that the node of the first quad tree binary tree is associated with an intra prediction type, parse a second first quad tree binary tree partitioning structure, and apply the second quad tree binary tree partitioning structure to samples values of the first component of video data included in nodes of the first quad tree binary tree.

In one example, a non-transitory computer-readable storage medium comprises instructions stored thereon that, when executed, cause one or more processors of a device to parse a first quad tree binary tree partitioning structure, apply the first quad tree binary tree partitioning structure to a first component of video data, apply the first quad tree binary tree partitioning structure to a second component of video data, determine whether a node of the first quad tree binary tree is associated with an intra prediction type, upon determining that the node of the first quad tree binary tree is associated with an intra prediction type, parse a second first quad tree binary tree partitioning structure, and apply the second quad tree binary tree partitioning structure to samples values of the first component of video data included in nodes of the first quad tree binary tree.

In one example, an apparatus comprises means for parsing a first quad tree binary tree partitioning structure, means for applying the first quad tree binary tree partitioning structure to a first component of video data, means for applying the first quad tree binary tree partitioning structure to a second component of video data, means for determining whether a node of the first quad tree binary tree is associated with an intra prediction type, means for parsing a second first quad tree binary tree partitioning structure, upon determining that the node of the first quad tree binary tree is associated with an intra prediction type, and means for applying the second quad tree binary tree partitioning structure to samples values of the first component of video data included in nodes of the first quad tree binary tree.

The details of one or more examples are set forth in the accompanying drawings and the description below. Other features, objects, and advantages will be apparent from the description and drawings, and from the claims.

The invention claimed is:

1. A method of partitioning video data for video coding, the method comprising:
specifying a quad tree binary tree type for a coding tree block;
partitioning the coding tree block into one or more first coding blocks based on the quad tree binary tree type in a case that the quad tree binary tree type is a common partitioning structure in a luma channel and a chroma channel;
specifying whether a prediction type for one of the one or more first coding blocks is an intra prediction type when the coding tree block is included in an inter slice;
partitioning the one of the one or more first coding blocks associated with the intra prediction type based on two different partitioning structures into one or more second coding blocks in the luma channel and one or more third coding blocks in the chroma channel when the coding tree block is included in an intra slice or the prediction type for the one of the one or more first coding blocks included in the inter slice is the intra prediction type; and
partitioning the one of the one or more first coding blocks based on a shared partitioning structure into one or more fourth coding blocks in the luma channel and the chroma channel when the prediction type for the one of the one or more first coding blocks included in the inter slice is an inter prediction type.

2. The method of claim 1, wherein the inter slice is one of a P slice and or a B slice.

3. The method of claim 1, wherein the prediction type is specified by a coding block size represented by multiplying a coding block width by a coding block height.

4. The method of claim 1, wherein the prediction type is specified by using a separate tree flag specifying whether the intra prediction type is used.

5. The method of claim 1, wherein the prediction type is specified by using a split mode indicating one of a vertical split mode, a horizontal split mode, a vertical triple tree split mode and a horizontal triple tree split mode.

6. A device for coding video data, the device comprising one or more processors configured to perform the method of claim 1.

7. A device for decoding video data, the device comprising one or more processors configured to perform the method of claim 1.

8. The method of claim 1, further comprising:
receiving a prediction mode flag indicating the prediction type for the one of the one or more first coding blocks and determining, based on the prediction mode flag, whether the luma channel for the one of the one or more first coding blocks is further partitioned into the one or more second coding blocks when the coding tree block is included in the inter slice; and
determining, without parsing the prediction mode flag, whether the luma channel for the one of the one or more first coding blocks is further partitioned into the one or more second coding blocks when the coding tree block is included in the intra slice.

9. The method of claim 1, further comprising:
determining whether the prediction type is the intra prediction type for specifying whether the luma channel for the one of the one or more first coding blocks is partitioned into the one or more second coding blocks when the coding tree block is included in the inter slice.

10. The method of claim 1, wherein the one or more second coding blocks are generated by a first partitioning structure and the one or more third coding blocks are generated by a second partitioning structure.

* * * * *